United States Patent
Matsumoto et al.

(10) Patent No.: US 7,400,689 B2
(45) Date of Patent: *Jul. 15, 2008

(54) DATA RECEPTION METHOD AND APPARATUS INCLUDING RECEPTION OF DATA IN A FIRST TRANSMISSION AND A RETRANSMISSION

(75) Inventors: Atsushi Matsumoto, Kanazawa (JP); Mitsuru Uesugi, Yokosuka (JP); Kenichi Miyoshi, Yokohama (JP); Toshiyuki Uehara, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/232,005

(22) Filed: Sep. 22, 2005

(65) Prior Publication Data

US 2006/0068724 A1    Mar. 30, 2006

Related U.S. Application Data

(63) Continuation of application No. 10/182,569, filed on Jul. 31, 2002, now Pat. No. 7,003,050.

(30) Foreign Application Priority Data

Dec. 27, 2000    (JP)    ............................. 2000-398772

(51) Int. Cl.
*H04L 27/00* (2006.01)
(52) U.S. Cl. ........................ 375/295; 375/324; 375/340; 714/746; 714/748; 714/749; 714/750; 714/751
(58) Field of Classification Search ................. 375/286, 375/295, 324, 340; 714/748–751, 746; 370/468, 370/480
See application file for complete search history.

(56) References Cited

U.S. PATENT DOCUMENTS 4,344,171 A    8/1982    Lin et al.

(Continued)

FOREIGN PATENT DOCUMENTS

CN    1411236    4/2003

(Continued)

OTHER PUBLICATIONS

M. Isaka, et al., "On the design of bit-interleaved coded modulation with Turbo codes", Institute of Industrial Science, The University of Tokyo, 1999, p. 311.

(Continued)

*Primary Examiner*—Curtis B. Odom
(74) *Attorney, Agent, or Firm*—Dickinson Wright, PLLC

(57) ABSTRACT

P/S conversion section 302 performs parallel/serial conversion of data sequences #1 through #4 input in parallel, in accordance with control by assignment control section 303, so that data to a higher-priority communication terminal is assigned to an upper bit in one symbol; M-ary modulation section 304 performs M-ary modulation on the data that has been subject to parallel/serial conversion; S/P conversion section 305 converts a symbol that has been subject to M-ary modulation to parallel form; multipliers 306-1 through 306-4 execute spreading processing on the symbols output in parallel; multiplexing section 309 multiplexes the symbol that has been subject to spreading processing with an assignment notification signal that has been subject to spreading processing; and radio transmitting section 310 transmits the multiplexed signal.

4 Claims, 15 Drawing Sheets

U.S. PATENT DOCUMENTS

| | | | |
|---|---|---|---|
| 4,495,619 A | | 1/1985 | Acampora |
| 4,523,323 A | | 6/1985 | Nakajima et al. |
| 4,780,883 A | | 10/1988 | O'Connor et al. |
| 4,866,395 A | | 9/1989 | Hostetter |
| 4,937,844 A | | 6/1990 | Kao |
| 5,134,635 A | * | 7/1992 | Hong et al. ............... 375/341 |
| 5,377,194 A | | 12/1994 | Calderbank |
| 5,396,518 A | | 3/1995 | How |
| 5,428,643 A | | 6/1995 | Razzell |
| 5,519,356 A | | 5/1996 | Greenberg |
| 5,524,025 A | | 6/1996 | Lawrence et al. |
| 5,822,371 A | | 10/1998 | Goldstein et al. |
| 5,831,561 A | | 11/1998 | Cai et al. |
| 5,914,959 A | | 6/1999 | Marchetto et al. |
| 6,126,310 A | | 10/2000 | Osthoff et al. |
| 6,134,694 A | | 10/2000 | Uebayashi et al. |
| 6,138,260 A | | 10/2000 | Ketseoglou |
| 6,233,254 B1 | | 5/2001 | Myers |
| 6,247,150 B1 | * | 6/2001 | Niemela ............... 714/701 |
| 6,259,744 B1 | * | 7/2001 | Lee et al. ............... 375/264 |
| 6,311,306 B1 | * | 10/2001 | White et al. ............... 714/790 |
| 6,347,125 B1 | * | 2/2002 | Dent ............... 375/341 |
| 6,473,878 B1 | | 10/2002 | Wei |
| 6,476,734 B2 | | 11/2002 | Jeong et al. |
| 6,567,475 B1 | | 5/2003 | Dent et al. |
| 6,584,190 B1 | | 6/2003 | Blessler |
| 6,606,355 B1 | | 8/2003 | Wei |
| 6,647,069 B1 | | 11/2003 | Segal et al. |
| 6,738,370 B2 | | 5/2004 | Ostman |
| 6,765,926 B1 | * | 7/2004 | Price et al. ............... 370/466 |
| 6,769,085 B2 | * | 7/2004 | Von Elbwart et al. ....... 714/748 |
| 6,879,576 B1 | * | 4/2005 | Agrawal et al. ............. 370/342 |
| 7,003,050 B2 | * | 2/2006 | Matsumoto et al. ......... 375/295 |

FOREIGN PATENT DOCUMENTS

| | | |
|---|---|---|
| DE | 19705354 | 8/1998 |
| EP | 0938207 | 8/1999 |
| EP | 1043858 | 10/2000 |
| EP | 1043858 A1 | 10/2000 |
| EP | 1447935 | 8/2004 |
| JP | 64055942 | 3/1989 |
| JP | 02312338 | 12/1990 |
| JP | 03274933 | 12/1991 |
| JP | 06006399 | 1/1994 |
| JP | 6252971 | 9/1994 |
| JP | 738448 | 2/1995 |
| JP | 07143185 | 6/1995 |
| JP | 879325 | 3/1996 |
| JP | 08065279 | 3/1996 |
| JP | 09307517 | 11/1997 |
| JP | 11177648 | 7/1999 |
| JP | 2000188609 | 7/2000 |
| JP | 2000201132 | 7/2000 |
| WO | 9959269 | 11/1999 |
| WO | 03019794 | 3/2003 |

OTHER PUBLICATIONS

M. P. Schmitt; "Improved Retransmission Strategy for Hybrid ARQ Schemes Employing TCM", IEEE 1999, pp. 1226-1228.
S. Lin, et al.; "A Hybrid ARQ Scheme with Parity Retransmission for Error Control of Satellite Channels", IEEE Transaction on Communications, vol. com-30, No. 7, Jul. 1982, pp. 1701-1719.
European Search Report dated May 31, 2002 relating to 10/295/,899.
US Office Action dated Jan. 12, 2004 in U.S. Appl. No. 10/295,899.
US Office Action dated Dec. 8, 2003 in U.S. Appl. No. 10/298,207.
International Search Report dated Oct. 16, 2001 relating to 10/239,794.
International Search Report dated Jan. 29, 2002 relating to 10/182,569.
U.S. Appl. No. 10/182,569.
U.S. Appl. No. 10/239,794.
U.S. Appl. No. 10/295,899.
Korean Office Action dated Jan. 15, 2005 with English translation.
M. Morimoto, et al., "A Hierarchical Image Transmission System for Multimedia Mobile Communication," First International Workshop on Wireless Image/Video Communications, IEEE COMSOC, EURASIP, Department of Communications Engineering, Faculty of Engineering, Osaka University, Osaka, Japan, pp. 80-84, Sep. 1996.
M. Morimoto, et al., "A Hierarchical Image Transmission System in a Fading Channel," Department of Electrical Engineering, Faculty of Engineering, Osaka, Japan, IEEE, pp. 769-772, Nov. 1995.
S. Kallel; "Analysis of a Type II Hybrid ARQ Scheme with Code Combining", IEEE Transactions on Communications, vol. 38, No. 8, Aug. 1990, pp. 1133-1137.
S. Kallel, et al.; "Throughput Performance of Memory ARQ Schemes", IEEE Transactions on Vehicular Technology, vol. 48, No. 3, May 1999, pp. 891-899.
D. Chase; "Code Combining-A Maximum-Likelihood Decoding Approach for Combining an Arbitrary Number of Noisy Packets", IEEE Transactions on Communications, vol. comm.-33, No. 5, May 1985, pp. 385-393.
B. A. Harvey, et al.; "Packet Combining Systems Based on the Viterbi Decoder", IEEE Transactions on Communications, vol. 42, No. 2/3/4, Feb./Mar./Apr. 1994, pp. 1544-1557.
M. P. Schmitt; "Hybrid ARQ scheme employing TCM and packet combining", Electronics Letters, IEE Stevenage, GB, vol. 34, No, 18, Sep. 3, 1998, pp. 1725-1726.
Krishna R. Narayanan, et al.; "A Novel ARQ Technique using the Turbo Coding Principle", IEEE Communications Letters, IEEE Service Center, Piscataway, US, vol. 1, No, 2, Mar. 1, 1997, pp. 49-51, XP000687091, ISSN: 1089-7798.
C. Berrou, et al.; "Near Shannon Limit Error-Correcting Coding and Decoding:Turbo-Codes(1)", IEEE 1993, pp. 1064-1070.
S. Le Goff, et al.; "Turbo-Codes and HIgh Spectral Efficiency Modulation", Telecom Bretagne, France Telecom University, IEEE 1994, pp. 645-649.
A. Burr; Modulation and Coding for Wireless Communications, Pearson Education, Prentice Hall, pp. 133-315.
6.8 Hybrid ARQ (H-ARQ), H-ARQ with Full IR (H-ARQ-Type-II), 3G TR25.848 V0.6.0 (May 2000), TSG-RAN Working Group 1 meeting #19 Las Vegas, USA, Feb. 27-Mar. 2, 2001, pp. 30-45.
"Enhanced HARQ Method with Signal Constellation Rearrangement", TSG-RAN Working Group 1 Meeting #19, Las Vegas, USA, Feb. 27-Mar. 2, 2001, Panasonic, AH24 (HSDPA), XP-002229383, pp. 1-11.
European Office Action dated Sep. 5, 2005.
European Search Report dated Sep. 6, 2005.
European Search Report dated Oct. 14, 2004.
Indian Office Action dated Nov. 3, 2004.
Office Action dated Feb. 14, 2006 in U.S. Appl. No. 11/003,437.
Chinese Office Action dated Jan. 20, 2006 with English translation.
Chinese Office Action dated Feb. 10, 2006 with English translation.
"ARQ Error Control Techniques," TSG-RAN Working Group 2 (Radio layer 2 and Radio layer3), TSGR2#2(99)085, Stockholm, pp. 1-5, Mar. 8-11, 1999.
Office Action dated Aug. 2, 2006 in U.S. Appl. No. 11/003,437.

* cited by examiner

DETERMINATION OF $b_1$

DETERMINATION OF $b_2$

DETERMINATION OF $b_3$

DETERMINATION OF $b_4$

FIRST TRANSMISSION

RETRANSMISSION (SECOND TRANSMISSION)

US 7,400,689 B2

DATA RECEPTION METHOD AND APPARATUS INCLUDING RECEPTION OF DATA IN A FIRST TRANSMISSION AND A RETRANSMISSION

This is a continuation of application Ser. No. 10/182,569 filed Jul. 31, 2002 now U.S. Pat. No. 7,003,050.

TECHNICAL FIELD

The present invention relates to a radio transmitting apparatus, radio receiving apparatus, and M-ary modulation communication system used in a digital radio communication system.

BACKGROUND ART

In a digital radio communication system such as a mobile communication system, data is transmitted by means of a modulation method so that a desired communication quality (for example, an error rate not exceeding a predetermined value on the receiver side) can be obtained. In modulation methods, there are M-ary modulation methods that transmit a plurality of bits with one symbol which is the modulation unit. Since a plurality of bits of information can be transmitted with one symbol (modulation unit) with the M-ary modulation method, throughput can be increased.

Such M-ary modulation methods include QPSK (Quaternary Phase Shift Keying), in which two bits of information are transmitted with one symbol, 16QAM (Quadrature Amplitude Modulation), in which four bits of information are transmitted with one symbol, and 64QAM, in which six bits of information are transmitted with one symbol. Under the same propagation environment, the greater the amount of information transmitted with one symbol, the greater the degree to which throughput can be increased.

In addition, a technology has been proposed for increasing overall system throughput by adaptively changing the modulation method for data to be transmitted in accordance with the propagation environment on the receiver side. This kind of technology is called adaptive modulation.

Recently, there has been a growing demand for the reception of image data, music data provided by music distribution services, and the like, by radio communication terminals such as mobile phones. To make it possible to receive such large volumes of transmitted data in a short time, it is desirable for downlink throughput to be further increased.

DISCLOSURE OF INVENTION

It is an object of the present invention to provide a radio transmitting apparatus radio receiving apparatus, and M-ary modulation communication system that enable throughput to be increased in data communications that use M-ary modulation.

As described above, with an M-ary modulation method, a plurality of bits of information are transmitted with one symbol. For example, with 16QAM, four bits of information are transmitted with one symbol. In 16QAM, four bits of information can be transmitted with one symbol by arranging 16 signal points in different positions in the IQ plane. A signal space diagram is a means of representing such a signal point arrangement. Below, 16QAM will be considered as an example of an M-ary modulation method, and a 16QAM signal space diagram will be described. FIG. 1 is a signal space diagram showing the 16QAM signal point arrangement.

As shown in FIG. 1, in 16QAM, 16 signal points are arranged at different positions in the IQ plane by performing quaternary amplitude modulation on the I-axis and the Q-axis, respectively. By this means, M-arization can be performed and four bits of information can be transmitted with one symbol. When M-arization is performed in this way, signal points are arranged so that adjacent symbols differ from one another only by one bit, as shown in FIG. 1, in order to improve a bit error rate characteristic. This is called "Gray coding". In FIG. 1, numerals in parentheses indicate bit assignments.

When Gray coding is performed, the error rate of each bit in one symbol differs according to the position to which that bit is assigned. That is to say, in the case of 16QAM, there is a higher probability of erroneous determination for the third and fourth bits than for the first and second bits. This point will be explained below. A case will be described where threshold values are +2, 0, and −2, for both the I-channel and the Q-channel, as shown in FIG. 1.

FIG. 2 is a drawing for explaining a determination method in 16QAM. Black points in FIG. 2 are the signal points shown in FIG. 1, and bit assignments in each symbol are the same as those shown in FIG. 1. On the receiver side, the bits of each symbol are determined as follows.

To consider the uppermost bit (leftmost bit) $b_1$ in FIG. 1, this bit is 0 in the positive area 101 on the I-axis (area to the right of the Q-axis), and is 1 in the negative area 102 on the I-axis (area to the left of the Q-axis). Therefore, on the receiver side, as shown in FIG. 2, when a received symbol is located in the I-axis positive area 101, $b_1$ is determined to be 0, and when a received symbol is located in the I-axis negative area 102, $b_1$ is determined to be 1. That is to say, it is possible to determine whether $b_1$ is 0 or 1 simply by determining which of the two areas a received symbol is located in. In other words, 0/1 determination can be made for $b_1$ simply by means of positive/negative determination for an I-axis value.

To consider the second uppermost bit (second bit from the left) $b_2$ in FIG. 1, this bit is 0 in the positive area 103 on the Q-axis (area above the I-axis), and is 1 in the negative area 104 on the Q-axis (area below the I-axis). Therefore, on the receiver side, as shown in FIG. 2, when a received symbol is located in the Q-axis positive area 103, $b_2$ is determined to be 0, and when a received symbol is located in the Q-axis negative area 104, $b_2$ is determined to be 1. That is to say, it is possible to determine whether $b_2$ is 0 or 1 simply by determining which of the two areas a received symbol is located in. In other words, 0/1 determination can be made for $b_2$ simply by means of positive/negative determination for a Q-axis value.

To consider the third uppermost bit (third bit from the left) $b_3$ in FIG. 1, this bit is 0 in the area 105 having the range of 0 to less than +2 on the I-axis and in the area 106 having the range of −2 to less than 0 on the I-axis, and is 1 in the area 107 having the range of +2 and above and in the area 108 having the range of less than −2 on the I-axis. Therefore, on the receiver side, as shown in FIG. 2, when a received symbol is located in the area 105 having the range of 0 to less than +2 on the I-axis or in the area 106 having the range of −2 to less than 0 on the I-axis, $b_3$ is determined to be 0, and when a received symbol is located in the area 107 having the range of +2 and above or in the area 108 having the range of less than −2 on the I-axis, $b_3$ is determined to be 1. That is to say, in order to determine whether $b_3$ is 0 or 1 it is necessary to determine which of the four areas a received symbol is located in.

To consider the lowermost bit (rightmost bit) $b_4$ in FIG. 1, this bit is 0 in the area 109 having the range of 0 to less than +2 on the Q-axis and in the area 110 having the range of −2 to less than 0 on the Q-axis, and is 1 in the area 111 having the range of +2 and above on the Q-axis and in the area 112 having the range of less than −2 on the Q-axis. Therefore, on the receiver side, as shown in FIG. 2, when a received symbol is located in the area 109 having the range of 0 to less than +2 on the Q-axis or in the area 110 having the range of −2 to less than 0 on the Q-axis, $b_4$ is determined to be 0, and when a received symbol is located in the area 111 having the range of +2 and above on the Q-axis or in the area 112 having the range of less than −2 on the Q-axis, $b_4$ is determined to be 1. That is to say, in order to determine whether $b_4$ is 0 or 1 it is necessary to determine which of the four areas a received symbol is located in.

Thus, while it is only necessary to determine which of the two areas a received symbol is located in as to $b_1$ and $b_2$, it is necessary to determine which of the four areas a received symbol is located in as to $b_3$ and $b_4$. Also, determination areas 101 through 104 are larger than determination areas 105 through 112. Therefore, the probability of $b_1$ or $b_2$ being erroneously determined is lower than the probability of $b_3$ or $b_4$ being erroneously determined.

This situation is not limited to 16QAM. That is to say, the same can be said if an M-ary modulation method is performed in a manner that a plurality of bits are contained in one symbol, and the error rate of each bit is different, with upper-order bits being less susceptible to error (although the error rate is the same for the plurality of bits in 16QAM, etc.).

The present inventors reached the present invention by considering that the resistance to error of each bit in an M-ary modulated symbol differs according to the position of the bit, and finding that the data error rate (that is, the data quality) can be adjusted by assigning data contained in one symbol (in the case of 16QAM, 4-bit data) to each bit based on the resistance to error of each bit.

In order to achieve the above object, in the present invention, when data is modulated by means of an M-ary modulation method, data that is preferably made less susceptible to error (that is, data that is preferably made high quality), it is assigned to an upper bit in one symbol which is a modulation unit, before being transmitted. By this means, throughput can be improved.

BEST MODE FOR CARRYING OUT THE INVENTION

With reference now to the accompanying drawings, embodiments of the present invention will be explained below.

Embodiment 1

Figure 3:
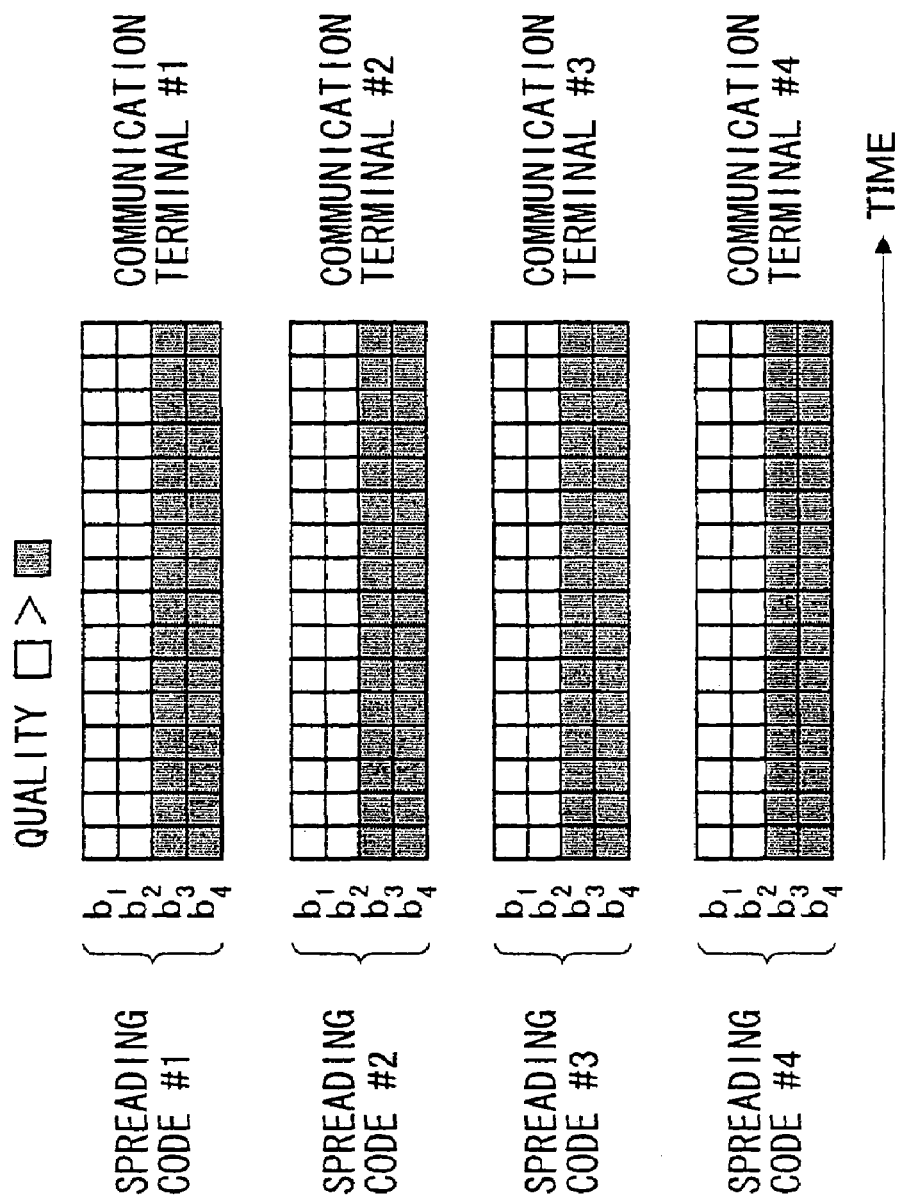
FIG. 3 is a drawing showing a relationship among communication terminals, spreading codes, and bit assignments in a conventional M-ary modulation communication system.

Conventionally, when a base station simultaneously transmits data to a plurality of communication terminals in a CDMA digital communication system, the data transmitted to each communication terminal is spread by means of a spreading code corresponding to the relevant communication terminal before being transmitted, as shown in FIG. 3. A case will be described below in which data is transmitted simultaneously to four communication terminals #1 through #4, using 16QAM as an M-ary modulation method. FIG. 3 is a drawing showing a relationship among communication terminals, spreading codes, and bit assignments in a conventional M-ary modulation communication system. Here, $b_1$ indicates the uppermost bit, $b_2$ indicates the second uppermost bit, $b_3$ indicates the third uppermost bit, and $b_4$ indicates the lowermost bit.

Conventionally, data transmitted to communication terminal #1 is spread by means of spreading code #1, data transmitted to communication terminal #2 by means of spreading code #2, data transmitted to communication terminal #3 by means of spreading code #3, and data transmitted to communication terminal #4 by means of spreading code #4, before being transmitted, as shown in FIG. 3. That is to say, conventionally, there is a correspondence between a communication terminal and a spreading code.

Here, the probability of $b_1$ or $b_2$ being erroneously determined is lower than the probability of $b_3$ or $b_4$ being erroneously determined, as explained above. That is to say, data assigned to $b_1$ and $b_2$ is of higher quality than data assigned to $b_3$ and $b_4$.

Figure 4:
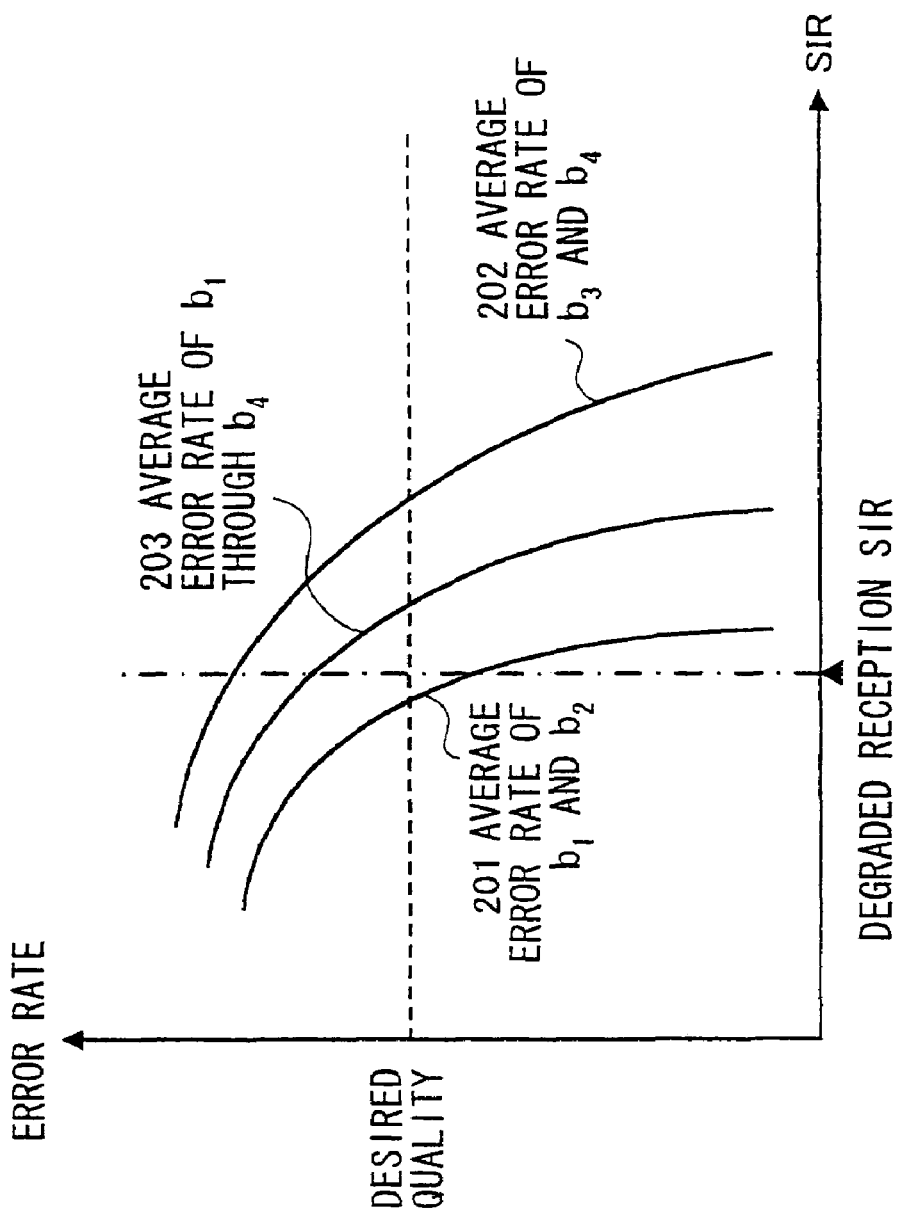
FIG. 4 is a graph showing error rate characteristics in a conventional M-ary modulation system.

Conventionally, however, data transmitted to communication terminals #1 through #4 is subjected to M-ary modulation on a communication terminal by communication terminal basis. That is to say, 4-bit data transmitted in one symbol to each terminal is transmitted assigned to the uppermost bit $b_1$ through the lowermost bit $b_4$ for the respective communication terminals. Thus, when average error rates of $b_1$ through $b_4$ are compared among the communication terminals, those average error rates will be equal as long as conditions such as propagation environments are the same. That is to say, the error rate characteristics of average error rates in all communication terminals are those shown as reference numeral 203 in FIG. 4 and the same. FIG. 4 is a graph showing error rate characteristics in a conventional M-ary modulation system. In this figure, reference-numeral 201 indicates the error rate characteristic of $b_1$ and $b_2$, reference numeral 202 indicates the error rate characteristic of $b_3$ and $b_4$, and reference numeral 203 indicates the error rate characteristic of the average error rate of $b_1$ through $b_4$.

Here, in a communication system in which an adaptive modulation is performed, for example, a modulation method is selected on the base station side according to a propagation environment so that this average error rate meets the desired quality on the communication terminal side. However, if the reception SIR of data degrades because of temporary deterioration of the propagation environment due to fading or the like, the average error rate of $b_1$ through $b_4$ 203 may fail to meet the desired quality in all communication terminals, as shown in FIG. 4. In a communication system in which the ARQ (Automatic Repeat reQuest) technique is used, in this case data retransmission to all communication terminals will occur, and overall system throughput will fall significantly.

Thus, in this embodiment, data to be transmitted to a communication terminal with a higher priority is assigned to an upper bit in a symbol before being transmitted, and the desired quality is met reliably for data to the high-priority communication terminal. By this means, overall system throughput can be improved.

Figure 5:
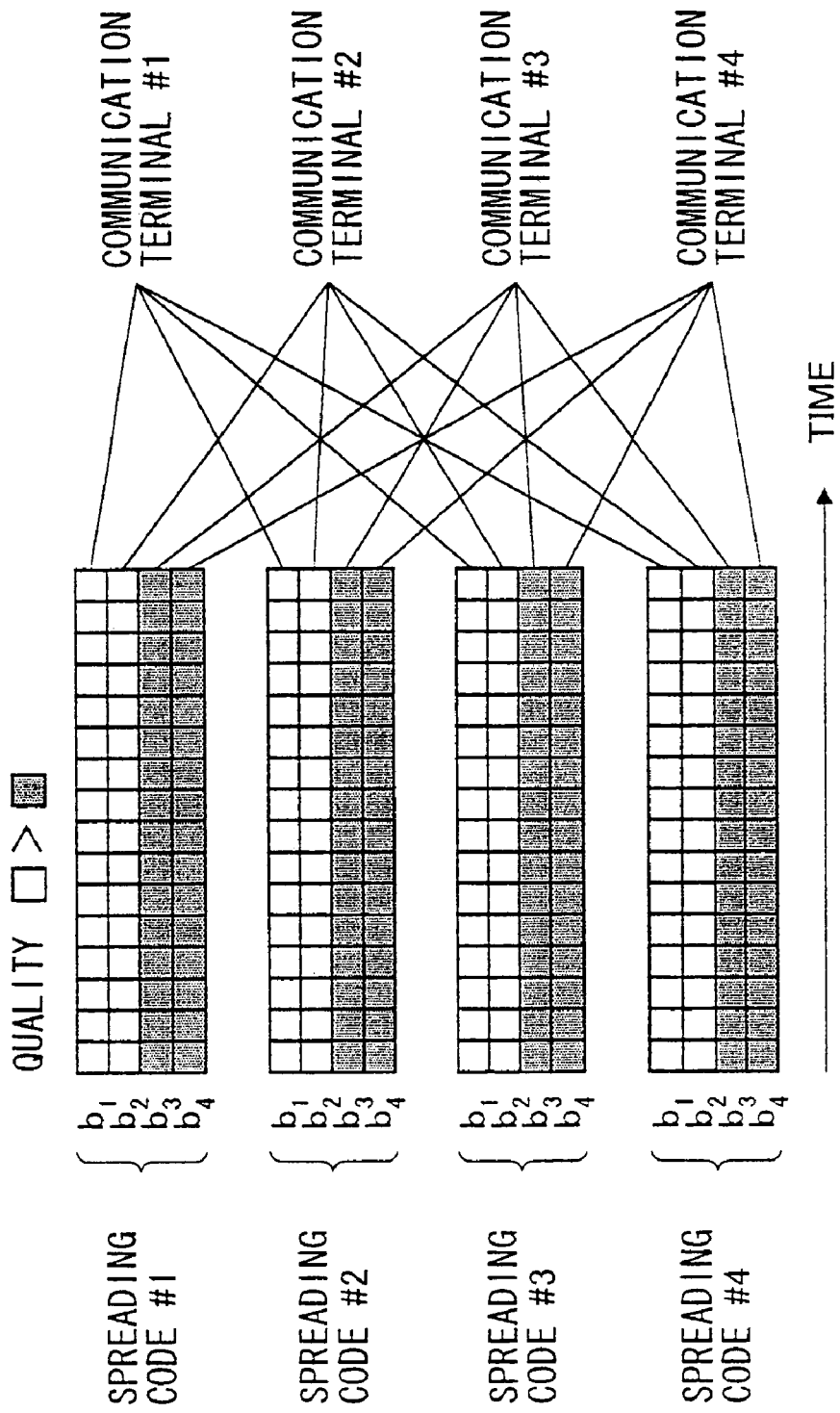
FIG. 5 is a drawing showing a relationship among communication terminals, spreading codes, and bit assignments in an M-ary modulation communication system according to Embodiment 1 of the present invention.

FIG. 5 is a drawing showing a relationship among communication terminals, spreading codes, and bit assignments in an M-ary modulation communication system according to Embodiment 1 of the present invention. Whereas, conventionally, there is a correspondence between a communication terminal and a spreading code, in this embodiment there is a correspondence between a communication terminal and a data bit assignment position. That is to say, data to be transmitted to the highest-priority communication terminal (here assumed to be communication terminal #1) is assigned to $b_1$, data to be transmitted to the second-highest-priority communication terminal (here assumed to be communication terminal #2) is assigned to $b_2$, data to be transmitted to the third-highest-priority communication terminal (here assumed to be communication terminal #3) is assigned to $b_3$, and data transmitted to the lowest-priority communication terminal (here assumed to be communication terminal #4) is assigned to $b_4$.

As stated above, data assigned to $b_1$ and $b_2$ is of higher quality than data assigned to $b_3$ and $b_4$ Consequently, as a result of using the kind of bit assignment shown in FIG. 5, data to be transmitted to communication terminal #1 and data to be transmitted to communication terminal #2 is of better quality than when the bit assignment shown in FIG. 3 is used, and is always made to meet the desired quality.

As a result, data to be transmitted to communication terminal #1 and data to be transmitted to communication terminal #2 reliably meet the desired quality even when the data reception SIR degrades because of temporary deterioration of a propagation environment due to fading or the like. That is to say, data to a high-priority communication terminal is made to meet the desired quality reliably. Therefore, a higher-priority communication terminal can complete data reception earlier. Also, it is made possible to reduce the number of times of data retransmission, and overall system throughput can be improved.

Figure 6:
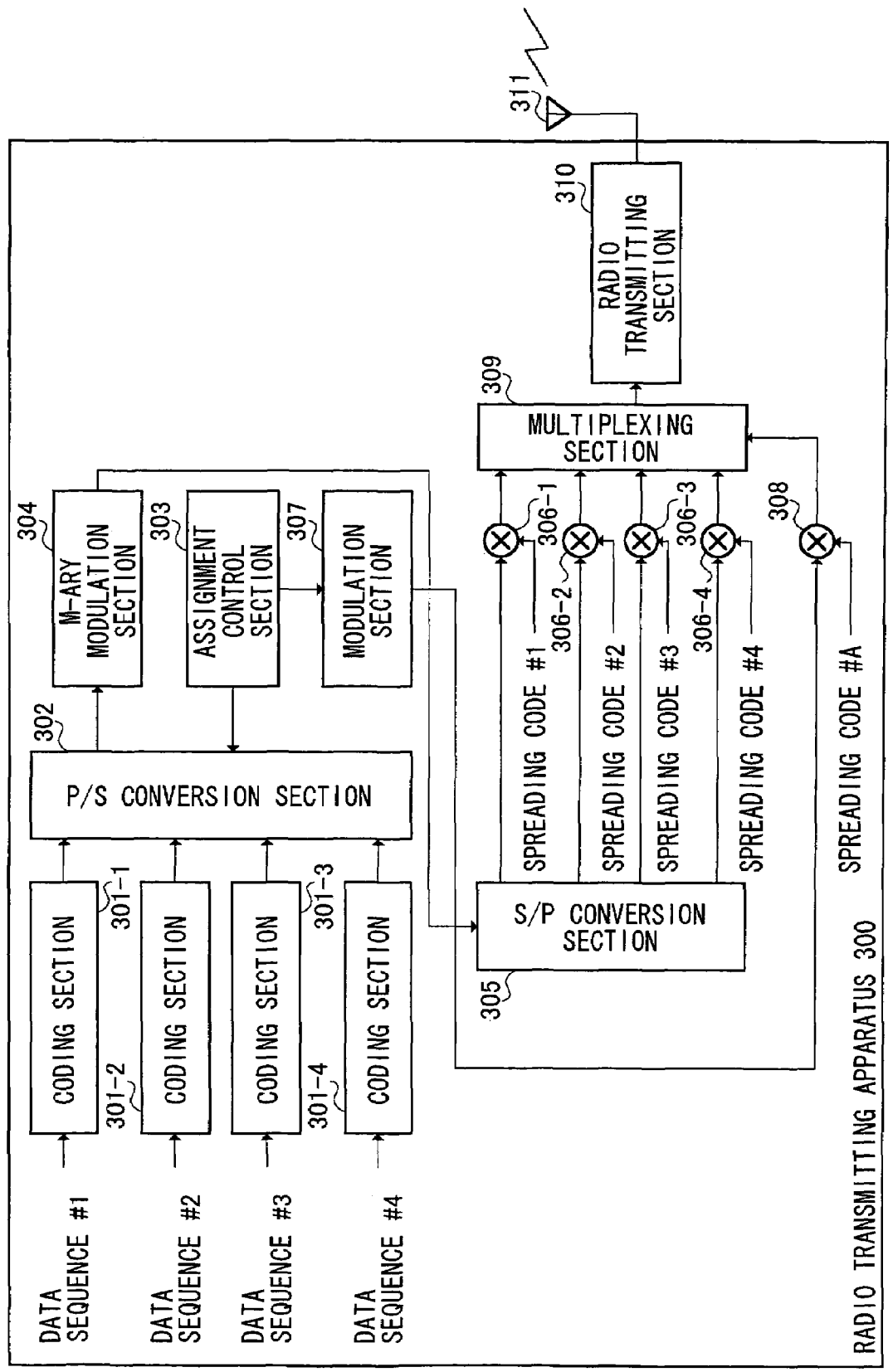
FIG. 6 is a block diagram showing a configuration of a radio transmitting apparatus used in an M-ary modulation communication system according to Embodiment 1 of the present invention.
Figure 7:
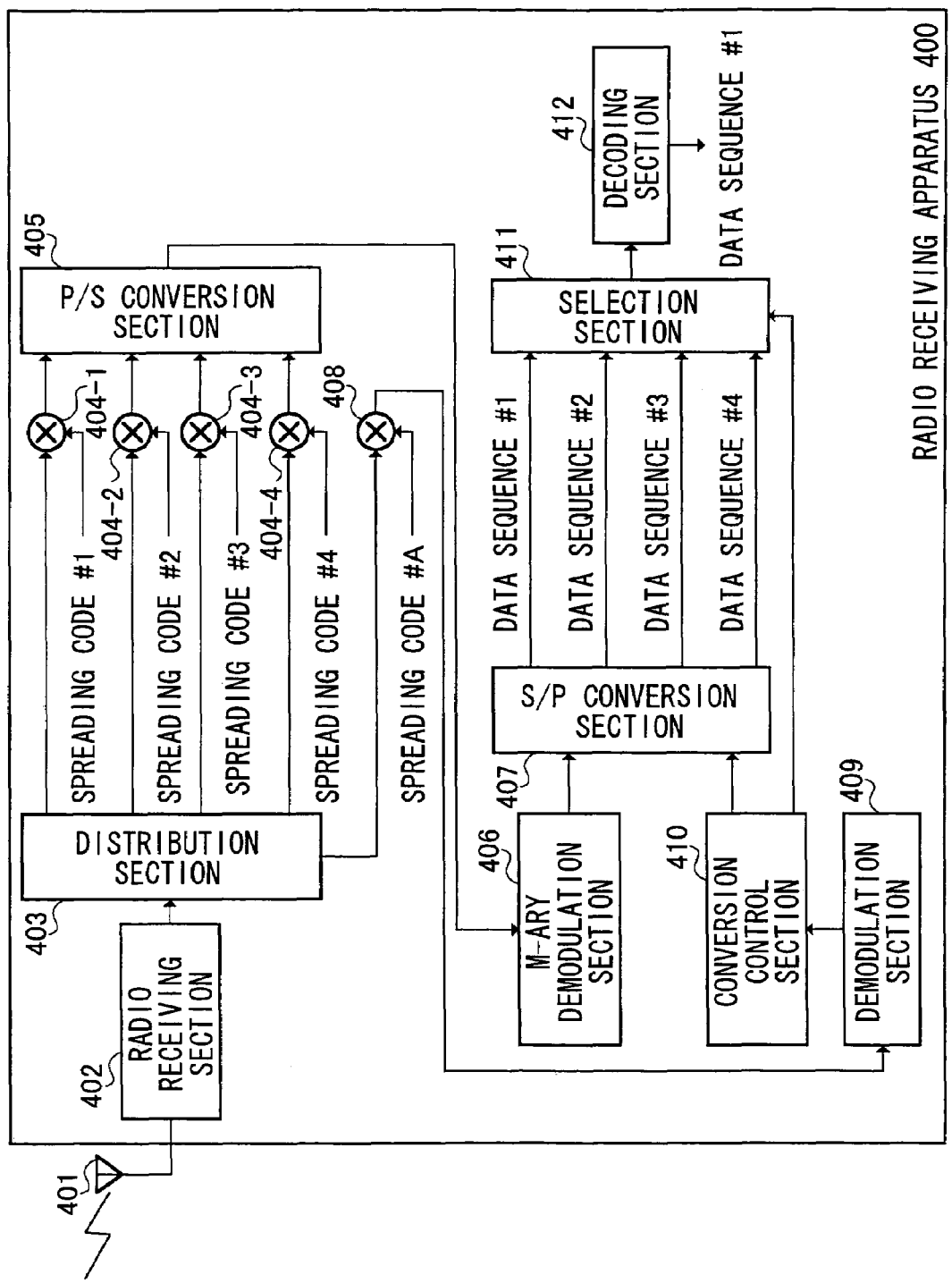
FIG. 7 is a block diagram showing a configuration of a radio receiving apparatus used in an M-ary modulation communication system according to Embodiment 1 of the present invention.

A radio transmitting apparatus and radio receiving apparatus used in an M-ary modulation communication system according to this embodiment will be described below. FIG. 6 is a block diagram showing a configuration of a radio transmitting apparatus used in an M-ary modulation communication system according to Embodiment 1 of the present invention, and FIG. 7 is a block diagram showing a configuration of a radio receiving apparatus used in an M-ary modulation communication system according to Embodiment 1 of the present invention. In the description, it is assumed that the radio transmitting apparatus is used being installed in a base station, and radio receiving apparatuses are used being installed in communication terminals. A case will be described in which data is simultaneously transmitted to four communication terminals.

In a radio transmitting apparatus 300, coding sections 301-1 through 301-4 execute coding processing on data sequences #1 through #4, respectively, and output data that has been subjected to coding processing to a P/S (parallel/serial) conversion section 302. Data sequences #1 through #4 are data sequences to be transmitted to communication terminals #1 through #4, respectively.

P/S conversion section 302 converts data sequences #1 through #4, input in parallel, to serial form, and outputs this data to M-ary modulation section 304. At this time, P/S conversion section 302 performs parallel/serial conversion so that a data sequence to a higher-priority communication terminal is assigned to an upper bit in a symbol, in accordance with control by assignment control section 303 which will be described later herein. A detailed description of bit assignment will be given later herein.

Figure 1:
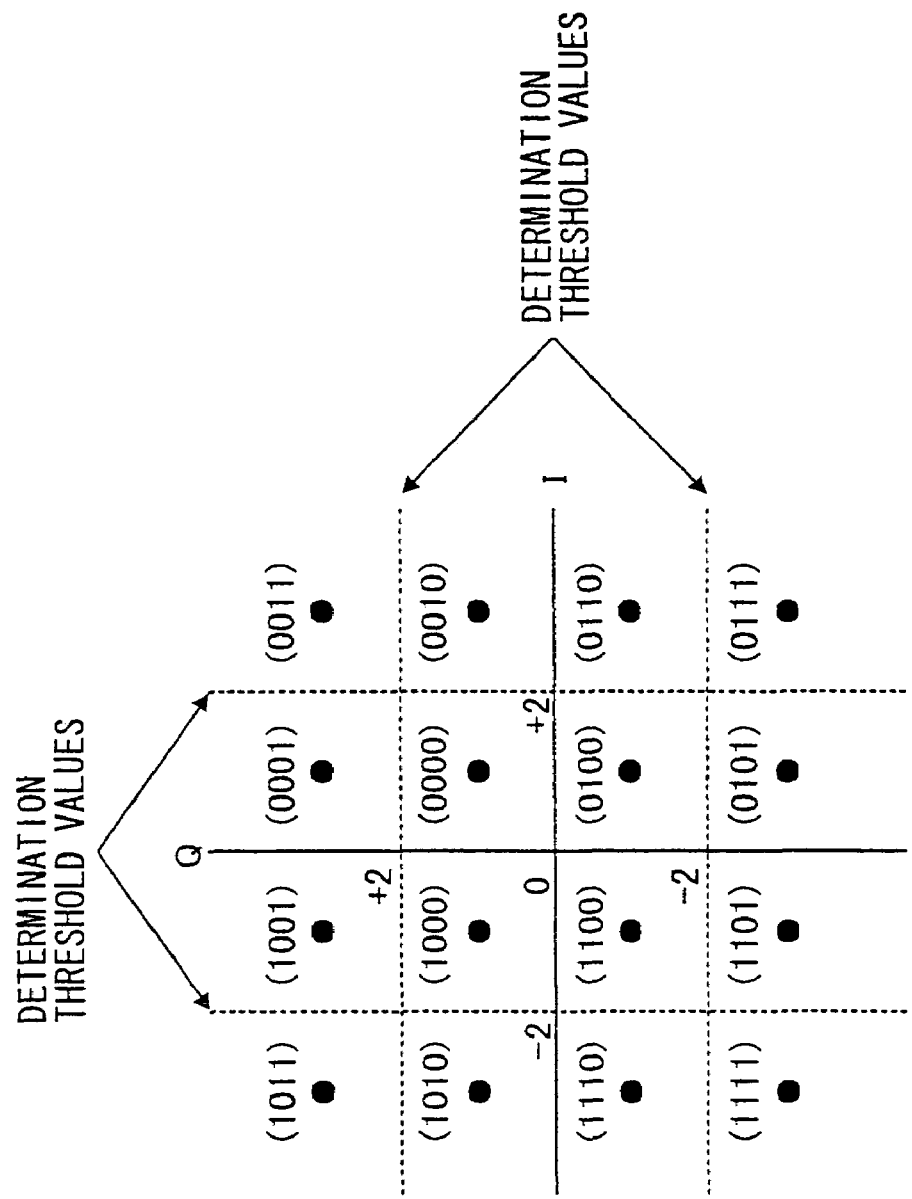
FIG. 1 is a signal space diagram showing a 16QAM signal point arrangement.
Figure 2:
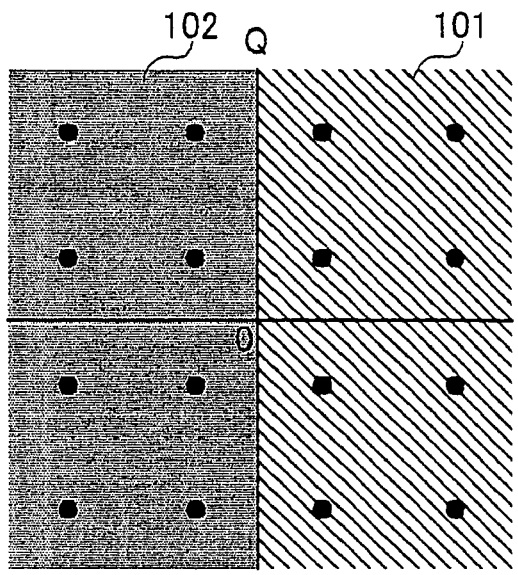
FIG. 2 is a drawing for explaining a determination method in 16QAM.
Figure 2:
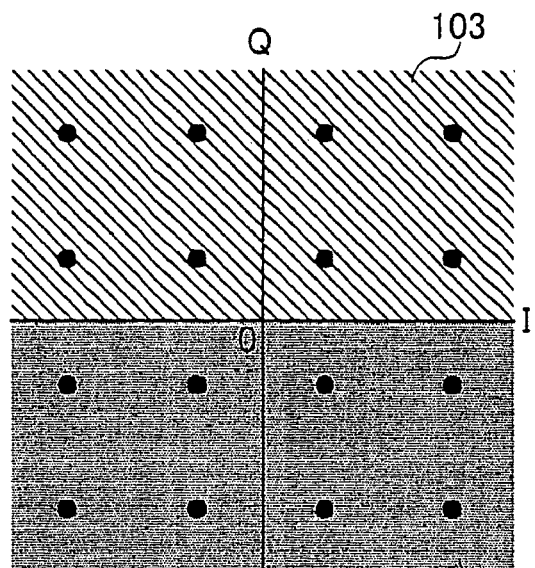
Figure 2:
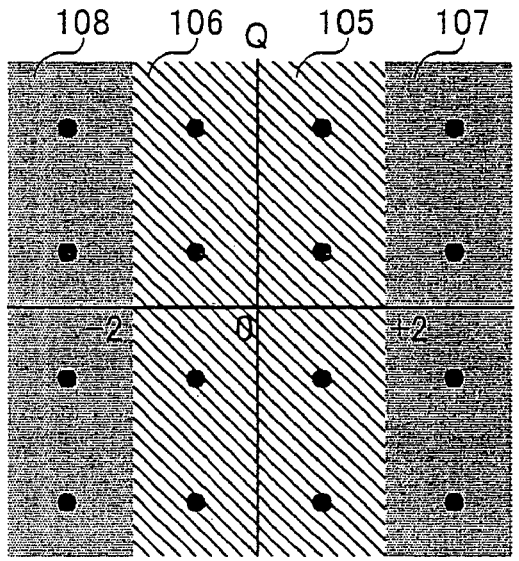
Figure 2:
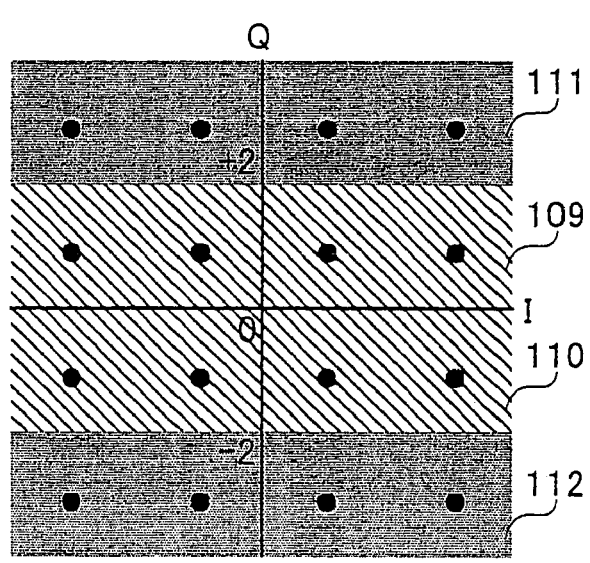

M-ary modulation section 304 performs M-ary modulation on data that has been subjected to parallel/serial conversion. Here, since it is necessary to transmit data to four communication terminals simultaneously, the use of 16QAM, which enables 4-bit data to be transmitted with one symbol, is assumed as the M-ary modulation method. Thus, M-ary modulation section 304 places data that has been subjected to parallel/serial conversion at one of the signal points shown in FIG. 1. A symbol that has been subjected to M-ary modulation is output to S/P (serial/parallel) conversion section 305.

S/P conversion section 305 converts a symbol input serially from M-ary modulation section 304 to parallel form, and outputs this to multipliers 306-1 through 306-4. That is to say, S/P conversion section 305 distributes a symbol input serially from M-ary modulation section 304 to multipliers 306-1 through 306-4 in the order of input. Multipliers 306-1 through 306-4 multiply a symbol output in parallel form from S/P conversion section 305 by spreading codes #1 through #4, respectively. The symbol that has been subjected to spreading processing is output to multiplexing section 309.

Assignment control section 303 indicates the bits to which data sequences #1 through #4 are to be assigned based on communication terminal priorities. That is to say, assignment control section 303 controls P/S conversion section 302 so that data to a higher-priority communication terminal is assigned to an upper bit in a symbol. A detailed description of bit assignment will be given later herein.

Assignment control section 303 outputs an assignment notification signal indicating which data sequence has been assigned to which bit to modulation section 307. The assignment notification signal is modulated by modulation section 307, multiplied by spreading code #A in multiplier 308, and input to multiplexing section 309.

Multiplexing section 309 multiplexes all the signals output from multipliers 306-1 through 306-4 and multiplier 308, and outputs the resulting signal to radio transmitting section 310. Radio transmitting section 310 executes predetermined radio processing, such as up-conversion, on the multiplexed signal, and then transmits the multiplexed signal to radio receiving apparatus 400 via antenna 311. In the following description, it is assumed that radio receiving apparatus 400 is installed in communication terminal #1.

The multiplexed signal received via antenna 401 of radio receiving apparatus 400 is subjected to predetermined radio processing, such as down-conversion, in radio receiving section 402, and is then input to distribution section 403. Distribution section 403 distributes the multiplexed signal to multipliers 404-1 through 404-4 and multiplier 408.

Multipliers 404-1 through 404-4 multiply the multiplexed signals output from distribution section 403 by spreading codes #1 through #4, respectively. By this means, symbols spread by means of spreading codes #1 through #4 are extracted from the multiplexed signals. Symbols that have been subjected to despreading processing are input to P/S conversion section 405.

P/S conversion section 405 converts a symbol input in parallel form to serial form, and outputs this to M-ary demodulation section 406. M-ary demodulation section 406 executes demodulation processing corresponding to the M-ary modulation performed in radio transmitting apparatus 300 on a symbol that has been subjected to parallel/serial conversion, and outputs the resulting signal to S/P conversion section 407. That is to say, M-ary demodulation section 406 performs M-ary demodulation based on 16QAM.

S/P conversion section 407 converts a data sequence input serially from M-ary demodulation section 406 to parallel form, and outputs the resulting signals to selection section 411. At this time, S/P conversion section 407 performs serial conversion that is the reverse of the parallel/serial conversion performed by P/S conversion section 302 in radio transmitting apparatus 300, in accordance with control by conversion control section 410 described later herein.

Multiplier 408 multiplies the multiplexed signal by spreading code #A. By this means, the assignment notification signal spread by means of spreading code #A is extracted from the multiplexed signal. The assignment notification signal is demodulated by demodulation section 409, and then input to conversion control section 410.

Conversion control section 410 controls S/P conversion section 407 so that serial conversion is performed that is the reverse of the parallel/serial conversion performed by P/S conversion section 302 in the radio transmitting apparatus 300, based on the assignment notification signal. Also, conversion control section 410 gives a directive to selection section 411 as to the signal line of S/P conversion section 407 from which a data sequence for this terminal (here, communication terminal #1) is to be output.

Selection section 411 selects a data sequence for this terminal in accordance with the directive from conversion control section 410, and outputs this data sequence to decoding section 412. Decoding section 412 decodes the data sequence selected by selection section 411. By this means, the data sequence for this terminal (that is, data sequence #1) is obtained.

Figure 8:
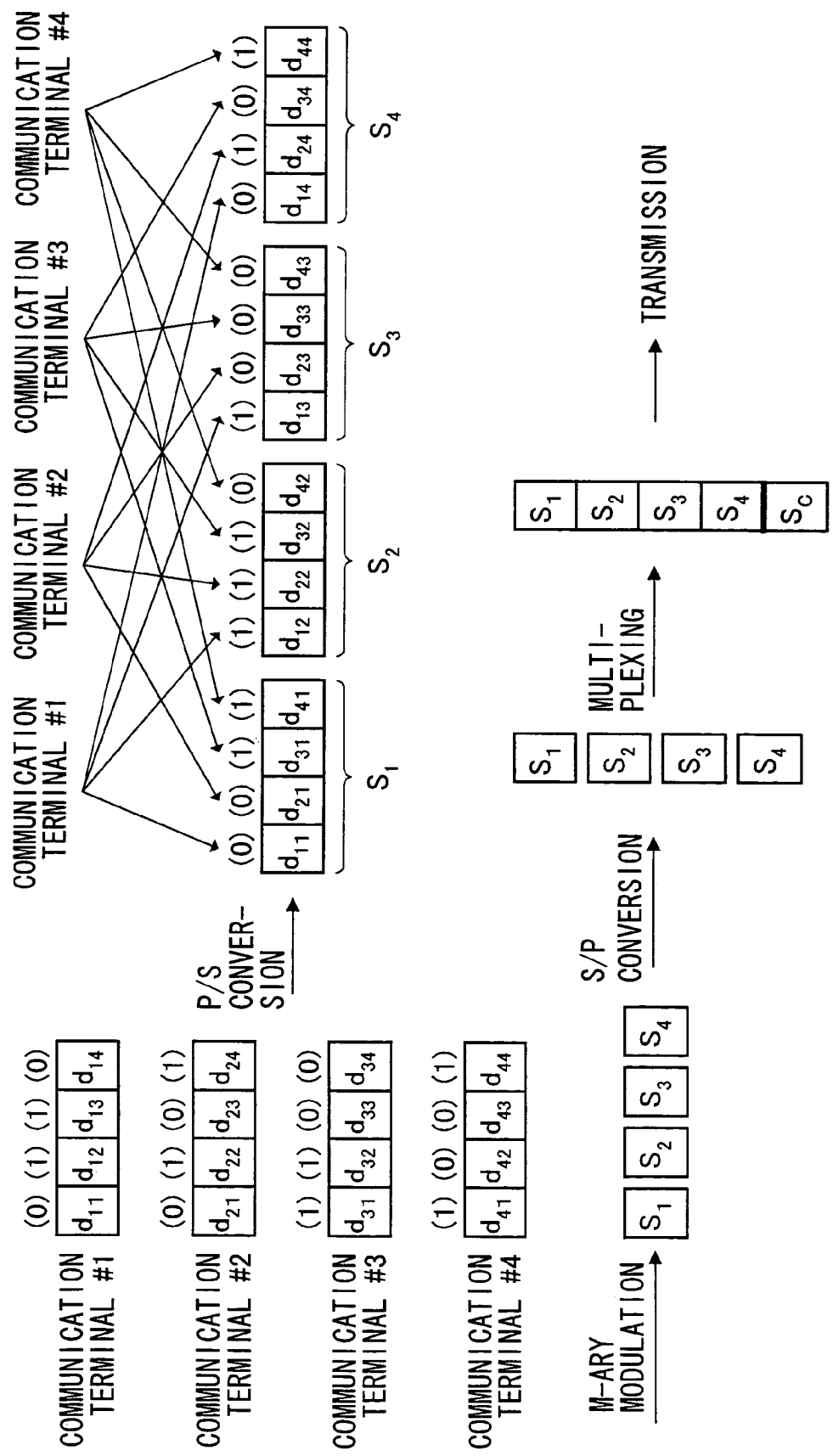
FIG. 8 is a drawing showing a typical operation of a radio transmitting apparatus used in an M-ary modulation communication system according to Embodiment 1 of the present invention.

An operation whereby data sequences #1 through #4 are assigned to bits in a symbol and transmitted will now be described specifically. FIG. 8 is a drawing showing a typical operation of a radio transmitting apparatus used in an M-ary modulation communication system according to Embodiment 1 of the present invention. In FIG. 8, data denoted by $d_{nm}$ indicates the m'th data transmitted to communication terminal #n. Thus, for example, $d_{11}$, $d_{12}$, $d_{13}$, and $d_{14}$ correspond to data sequence #1 transmitted to communication terminal #1. The number shown in parentheses above $d_{nm}$ indicates the content (0 or 1) of that data. $S_1$ indicates the first symbol transmitted from radio transmitting apparatus 300.

First, P/S conversion section 302 performs parallel/serial conversion (P/S conversion) so that a data sequence to a higher-priority communication terminal is assigned to an upper bit in a symbol, in accordance with control by assignment control section 303. The high-to-low priority order is here assumed to be: communication terminal #1→communication terminal #2 →communication terminal #3→communication terminal #4.

A priority order determining method here can be the following one: a communication terminal with a better propagation path environment is given a higher priority. By this means, the quality of an originally high quality data sequence is further improved because of the good propagation path environment, and therefore data transmission to a communication terminal whose propagation path environment is good can be reliably completed more quickly.

Another method is: a communication terminal having a larger amount of untransmitted data is given a higher priority. By this means, the quality of a data sequence to a communication terminal having a larger amount of untransmitted data is further improved, and the throughput of the communication terminal having a larger amount of untransmitted data is further improved. The better the throughput is, the sooner the amount of untransmitted data is reduced, and therefore the priority order varies with time. Thus, according to this method, it is possible to improve overall system throughput while keeping the throughput of all communication terminals substantially the same.

Yet another method is: a communication terminal used by a user paying a higher charge is given a higher priority. According to this method, the quality of a data sequence to a communication terminal used by a user paying a higher charge is better, and therefore a communication service wherein the convenience of a user is treated differently according to paid charge can be provided.

A still further method is: a communication terminal with a poorer propagation environment is given a higher priority, for example, in a communication system in which an adaptive modulation is performed. By this means, it is possible to compensate for deterioration of quality due to a poor propagation path environment, and the quality of a data sequence to a communication terminal with a poor propagation path environment can be improved to a desired quality. Since the quality of a data sequence to a communication terminal with a good propagation path environment already meets a desired quality, use of this method enables overall system throughput to be increased.

Which of these determining methods is to be used can be decided in accordance with a service provided by an M-ary modulation communication system according to this embodiment, or the circumstances and environment in which an M-ary modulation communication system according to this embodiment is installed.

As the high-to-low priority order is communication terminal #1→communication terminal #2→communication terminal #3→communication terminal #4, P/S conversion section 302 performs parallel/serial conversion so that data $d_{11}$, $d_{12}$, $d_{13}$, and $d_{14}$ are assigned to the uppermost bits of symbols $S_1$ through $S_4$, as shown in FIG. 8. Similarly, P/S conversion section 302 assigns data $d_{21}$, $d_{22}$, $d_{23}$, and $d_{24}$ to the second uppermost bits, data $d_{31}$, $d_{32}$, $d_{33}$, and $d_{34}$ to the third uppermost bits, and data $d_{41}$, $d_{42}$, $d_{43}$, and $d_{44}$ to the lowermost bits. In this way, a correspondence is established between a data sequence and a particular bit position in a symbol.

That is to say, data corresponding to highest-priority communication terminal #1 is assigned to the uppermost bit, data corresponding to second-highest-priority communication terminal #2 is assigned to the second uppermost bit, data corresponding to third-highest-priority communication terminal #3 is assigned to the third uppermost bit, and data corresponding to lowest-priority communication terminal #4 is assigned to the lowermost bit. Thus, a data sequence to be transmitted to a higher-priority communication terminal can have a lower error rate and a better quality. With 16QAM, the quality of the uppermost bit and the quality of the second uppermost bit are the same, and the quality of the third uppermost bit and the quality of the lowermost bit are the same, and therefore the quality of a data sequence to communication terminal #1 and the quality of a data sequence to communication terminal #2 are here the same, and the quality of a data sequence to communication terminal #3 and the quality of a data sequence to communication terminal #4 are the same.

Figure 9:
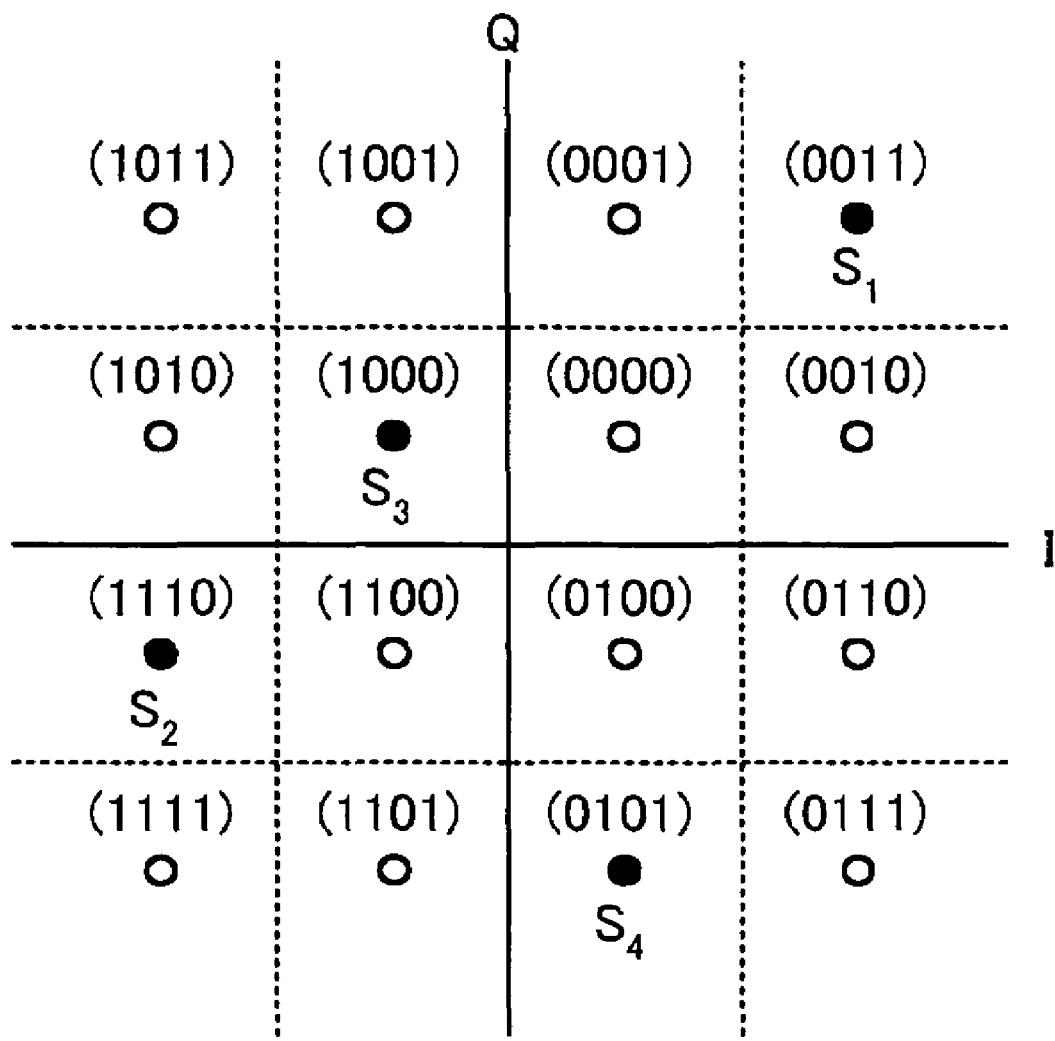
FIG. 9 is a drawing showing a signal point arrangement in a radio transmitting apparatus used in an M-ary modulation communication system according to Embodiment 1 of the present invention.

Next, data that has been subjected to parallel/serial conversion is subjected to M-ary modulation by M-ary modulation section 304 using 16QAM. As symbol $S_1$ is 0011, symbol $S_2$ is 1110, symbol $S_3$ is 1000, and symbol $S_4$ is 0101, the symbols are modulated so as to be arranged at the signal points indicated by the black circles in FIG. 9. The modulated symbols are subjected to serial/parallel conversion (S/P conversion) by S/P conversion section 305. Then symbols. $S_1$ through $S_4$ are subjected to spreading processing by multipliers 306-1 through 306-4.

In multiplexing section 309, symbols $S_1$ through $S_4$ that have been subjected to spreading processing and assignment notification signal $S_c$ that has been subjected to spreading processing are multiplexed. The multiplexed signal is then transmitted to radio receiving apparatus 400.

Figure 10:
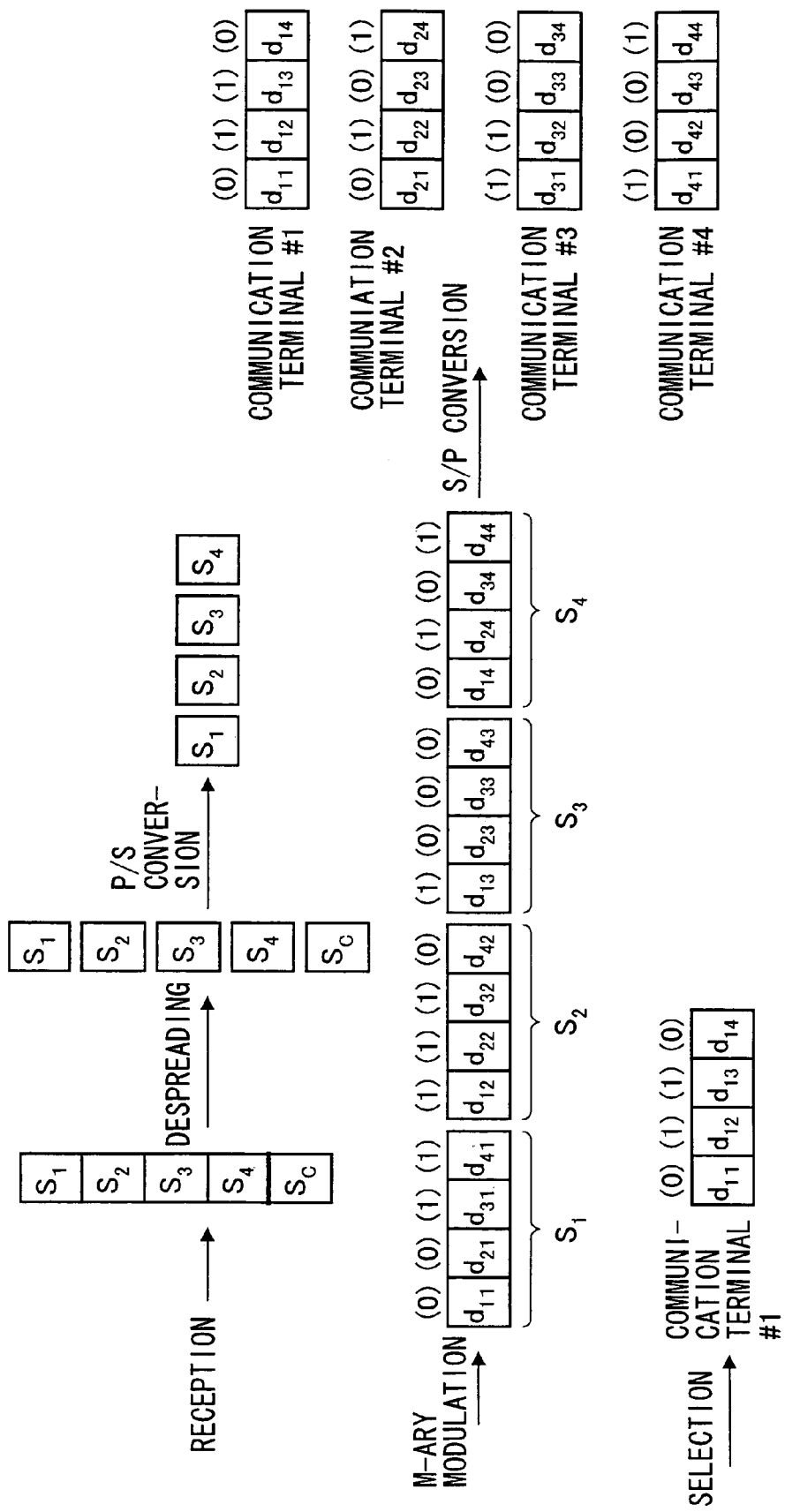
FIG. 10 is a drawing showing a typical operation of a radio receiving apparatus used in an M-ary modulation communication system according to Embodiment 1 of the present invention.

Then, an operation of radio receiving apparatus 400 will now be described in detail. FIG. 10 is a drawing showing a typical operation of a radio receiving apparatus used in an M-ary modulation communication system according to Embodiment 1 of the present invention.

A multiplexed signal received by radio receiving apparatus 400 is subjected to despreading processing by multipliers 404-1 through 404-4 and multiplier 408. By this means, symbols $S_1$ through $S_4$ and assignment notification signal $S_c$ are extracted from the multiplexed signal. Symbols $S_1$ through $S_4$ are subjected to parallel/serial conversion (P/S conversion) by P/S conversion section 405, and are subjected to M-ary demodulation based on 16QAM by M-ary demodulation section 406. As a result, data sequence $d_{11}$, $d_{21}$, $d_{31}$, $d_{41}$, $d_{12}$, $d_{22}$, ... is output serially. That is to say, a data sequence to which data to communication terminal #1 has been assigned is output to the uppermost bit of each symbol.

Next, in S/P conversion section 407, the data sequence output serially from M-ary demodulation section 406 is converted to parallel form in accordance with control by conversion control section 410. Conversion control section 410 can ascertain data to each terminal has been assigned to which of the bits by means of the assignment notification signal. Here, it can be ascertained that data $d_{11}$, $d_{12}$, $d_{13}$, and $d_{14}$ to communication terminal #1 have been assigned to the uppermost bit, data $d_{21}$, $d_{22}$, $d_{23}$, and $d_{24}$ to communication terminal #2 assigned to the second uppermost bit, data $d_{31}$, $d_{32}$, $d_{33}$, and $d_{34}$ to communication terminal #3 assigned to the third uppermost bit, and data $d_{41}$, $d_{42}$, $d_{43}$, and $d_{44}$ to communication terminal #4 assigned to the lowermost bit.

Then, conversion control section 410 controls serial/parallel conversion (S/P conversion) by S/P conversion section 407 so that the data sequence output serially from M-ary demodulation section 406 is output from S/P conversion section 407 for each of data sequences #1 through #4. In accordance with this control, serial/parallel conversion is performed and data sequences #1 through #4 of communication terminals #1 through #4 are output in parallel as shown in FIG. 10.

The data sequence for this terminal is then selected by selection section 411. Selection section 411 receives an indication by conversion control section 410 as to the signal line of S/P conversion section 407 from which the data sequence for this terminal is to be output. Selection section 411 selects the data sequence for this terminal in accordance with that indication. Here, this terminal is communication terminal #1, and so selection section 411 selects the data sequence output from the topmost signal line of the signal lines from S/P conversion section 407. By this means, data sequence #1 ($d_{11}$, $d_{12}$, $d_{13}$, $d_{14}$) to communication terminal #1 is selected, and is output to decoding section 412.

The whole of this data sequence #1 is data transmitted being assigned to the uppermost bits of symbols. Therefore, the quality of this data sequence #1 meets a desired quality reliably even when the reception SIR degrades because of temporary deterioration of the propagation environment due to fading or the like.

Thus, according to this embodiment, since data to a higher-priority communication terminal is assigned to an upper bit in a symbol which has been subjected to M-ary modulation before being transmitted, the quality of data to a high-priority communication terminal becomes substantially higher than a desired quality. Consequently, the quality of data to a high-priority communication-terminal is made to meet a desired quality reliably. As a result, the possibility of occurrence of retransmission is reduced for a high-priority communication terminal. Moreover, it is possible to prevent the data quality from failing to meet a desired quality in all communication terminals even when the propagation environment deteriorates. Thus, the number of times of data retransmission in the whole system decreases, and overall system throughput can be improved.

Also, since the possibility of occurrence of retransmission is reduced for a high-priority communication terminal, a high-priority communication terminal can complete data transmission more quickly. By completing data transmission to a high-priority communication terminal, it becomes possible to assign the high quality bit assigned to the communication terminal to a low-priority communication terminal. As a result, the number of times of data retransmission also decreases for low-priority communication terminals, and thus overall system throughput can be improved.

When data transmission to a high-priority communication terminal is completed and a high-quality bit is assigned to data to be transmitted to a lower-priority communication terminal, data to the same terminal may also be transmitted being assigned to two or more bits in one symbol. By this means, throughput can be further improved.

Figure 11:
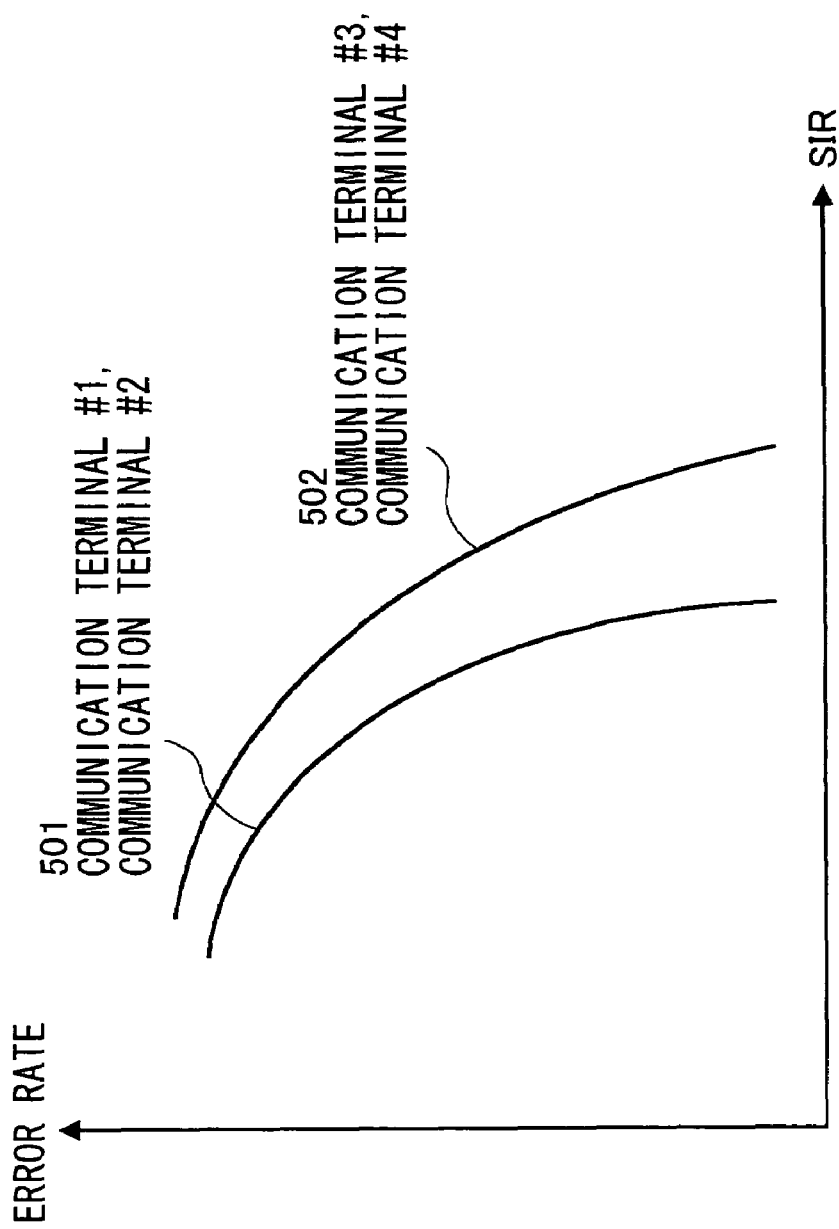
FIG. 11 is a graph showing an error rate characteristic for each communication terminal in a radio receiving apparatus used in an M-ary modulation communication system according to Embodiment 1 of the present invention.

Also, when the same M-ary modulation method is applied to all communication terminals (in this embodiment, 16QAM is used for all communication terminals), the data error rate characteristics have conventionally been the same in all the communication terminals. However, in this embodiment, since bit assignment is performed according to priority level, even if the same M-ary modulation method is applied to all communication terminals, it is possible to set error rate characteristics separately for each communication terminal according to priority level, as shown in FIG. 11. That is to say, when the high-to-low priority order is communication terminal #1→communication terminal #2 →communication terminal #3→communication terminal #4, and 16QAM is applied to all communication terminals #1 through #4, as in this embodiment, the error rate characteristic 501 of communication terminal #1 and communication terminal #2 can be made better than the error rate characteristic 502 of communication terminal #3 and communication terminal #4. Thus, according to this embodiment, a plurality of error rate characteristics can be set for one M-ary modulation method. By this means, even when the same M-ary modulation method is applied to a plurality of communication terminals, it is possible to perform quality control on a communication terminal by communication terminal basis with one M-ary modulation method.

Furthermore, since it is possible to set a plurality of qualities with one M-ary modulation method, it is possible to perform more precise quality control than a conventional adaptive modulation by also selecting the bits to which transmit data is assigned when a modulation method is selected in a communication system in which adaptive modulation is performed.

If radio transmitting apparatus 300 is used being installed in a base station used in a mobile communication system, and radio receiving apparatuses 400 are used being installed in communication terminals used in a mobile communication system, communication terminals in the radio zone of the base station change with time. That is to say, in this embodiment, communication terminals #1 through #4 change with time. Therefore, if this embodiment is applied to a mobile communication system, it is necessary to transmit the assignment notification signal to each communication terminal as described above.

However, in a radio communication system in which communication terminals #1 through #4 do not change (such as a radio LAN system, for example) bit assignments are known by the communication terminals in advance, and therefore the assignment notification signal need not be transmitted. Therefore, in this kind of radio communication system, a section for generation, transmission, reception and the like of the assignment notification signal can be omitted from radio transmitting apparatus 300 and radio receiving apparatus 400, enabling the apparatus configuration to be simplified.

Also, with 16QAM, for example, it is possible to transmit data for a maximum of four communication terminals with one symbol, and with 64QAM it is possible to transmit data for a maximum of six communication terminals with one symbol. Thus, in this embodiment, the M-ary modulation method used can be selected according to the number of communication terminals to which data is to be transmitted simultaneously.

Embodiment 2

Conventionally, in a communication system in which the ARQ (Automatic Repeat reQuest) technique is used, a symbol with the same content is retransmitted when retransmission is performed. That is to say, when M-ary modulation is performed, bit positions to which data are assigned in one symbol are the same in the first transmission and in a retransmission.

Here, as stated above, with an M-ary modulation method, a lower bit in one symbol may be erroneously determined with a higher probability. For example, in 16QAM, as described above, third bit $b_3$ and fourth bit $b_4$ have a higher probability of being erroneously determined than first bit $b_1$ and second bit $b_2$. Therefore, lower bits third bit $b_3$ and fourth bit $b_4$ are susceptible to error in a retransmission. Consequently, it is also difficult for the average error rate of $b_1$ through $b_4$ to meet a desired quality in a retransmission, and a further retransmission may occur.

Thus, in this embodiment, when retransmitting, bit positions to which data are assigned in one symbol are changed from those in the first transmission. That is to say, when retransmitting, data which was assigned to an upper bit in the first transmission is assigned to a lower bit, and data which was assigned to a lower bit in the first transmission is assigned to an upper bit. As a result, when retransmitting, the probability of erroneously determining the data which was assigned to a lower bit in the first transmission is lowered.

On the receiver side, the demodulation result of a symbol transmitted in the first transmission and the demodulation result of a symbol transmitted in the retransmission are combined. As a result, all data in one symbol has the same degree of resistance to error, and the quality of all data is made to meet a desired quality reliably. Thus, the number of times of retransmission can be reduced and throughput can be improved.

Figure 12:
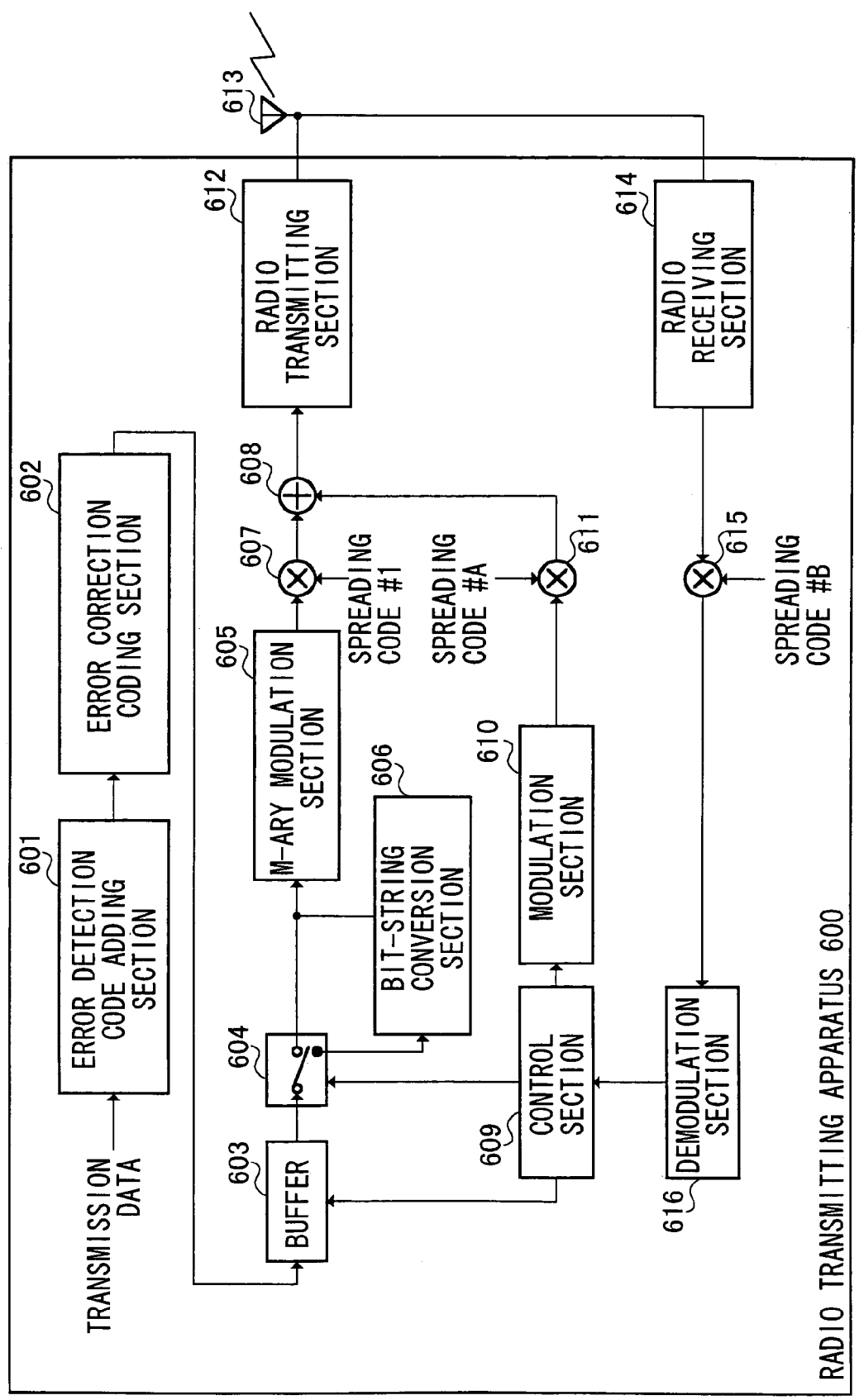
FIG. 12 is a block diagram showing a configuration of a radio transmitting apparatus used in an M-ary modulation communication system according to Embodiment 2 of the present invention.
Figure 13:
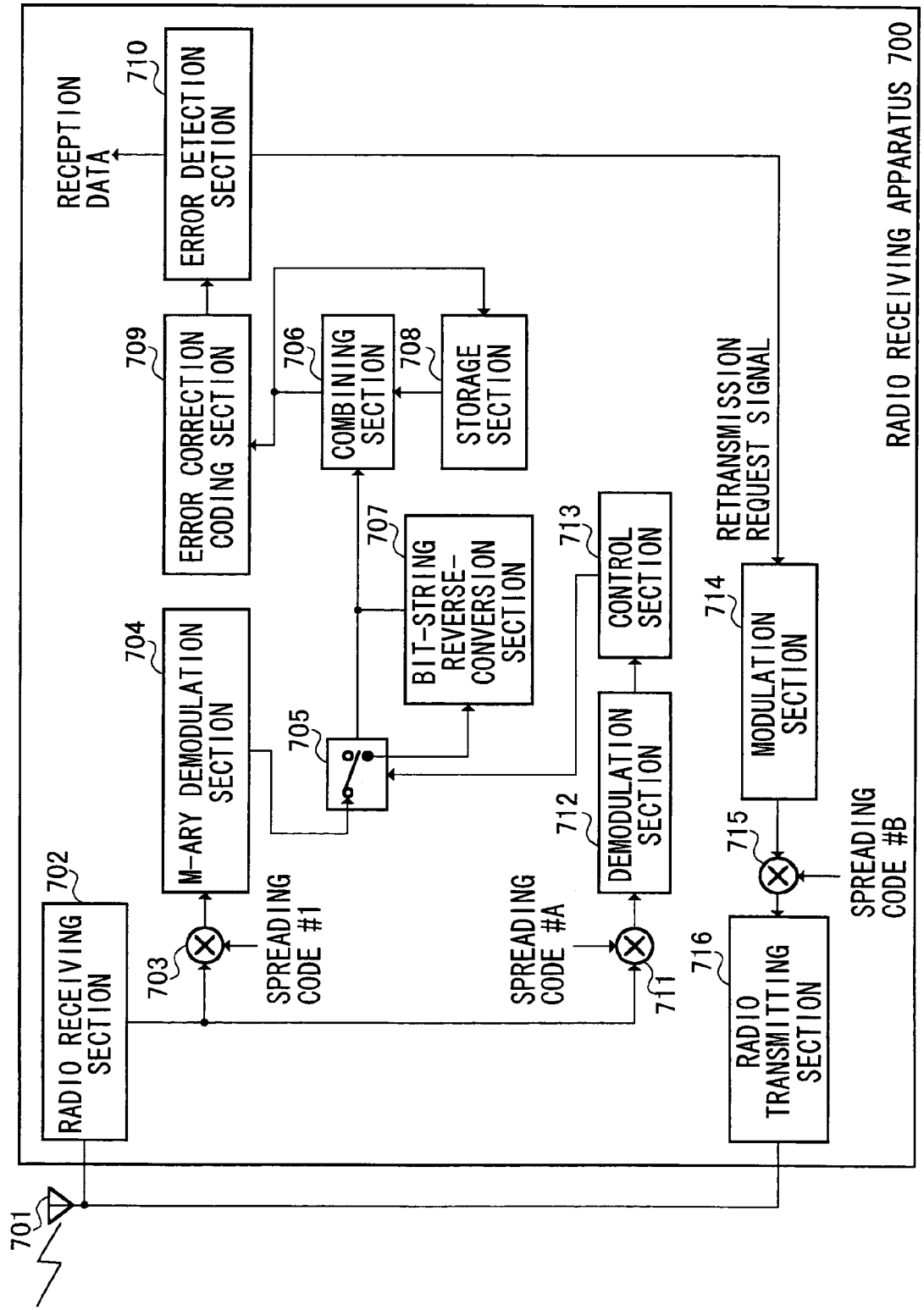
FIG. 13 is a block diagram showing a configuration of a radio receiving apparatus used in an M-ary modulation communication system according to Embodiment 2 of the present invention.

A radio transmitting apparatus and radio receiving apparatus used in an M-ary modulation communication system according to this embodiment will be described below. FIG. 12 is a block diagram showing a configuration of a radio transmitting apparatus used in an M-ary modulation communication system according to Embodiment 2 of the present invention, and FIG. 13 is a block diagram showing a configuration of a radio receiving apparatus used in an M-ary modulation communication system according to Embodiment 2 of the present invention.

In radio transmitting apparatus 600, error detection code adding section 601 adds a CRC (Cyclic Redundancy Check) bit or similar error detection code to transmission data on a predetermined unit basis, and outputs the resulting data to error correction coding section 602.

Error correction coding section 602 performs error correction coding of transmission data by means of convolutional coding or the like, for example. Error-correction-coded data is output to switch 604 via buffer 603. At this time, transmission data is stored in buffer 603.

Switch 604 is subjected to switching control by control section 609, and connects buffer 603 to M-ary modulation section 605 at the time of an odd-numbered transmission including the first transmission, and connects buffer 603 to bit-string conversion section 606 at the time of an even-numbered transmission.

Bit-string conversion section 606 reverses the order of bits in one symbol between an odd-numbered transmission and an even-numbered transmission. That is to say, bit-string conversion section 606 changes bit positions to which data are assigned in one symbol each time a data retransmission occurs. By this means, data which was assigned to a lower bit in an odd-numbered transmission is assigned to an upper bit in an even-numbered transmission, and data which was assigned to an upper bit in an odd-numbered transmission is assigned to a lower bit in an even-numbered transmission.

M-ary modulation section 605 performs M-ary modulation on data input serially from buffer 603, or on data whose bit-string has been converted by bit-string conversion section 606. It is here assumed that 16QAM, in which four bits of data are transmitted with one symbol, is used as the M-ary modulation method. M ary modulation section 605 therefore places input data at one of the signal points shown in FIG. 1. The symbol that has been subjected to M-ary modulation is output to multiplier 607. Multiplier 607 multiplies the M-ary modulated symbol by spreading code #1 to communication terminal #1. The symbol that has been subjected to spreading processing is output to multiplexer 608.

Control section 609 indicates to buffer 603 the data to be retransmitted in accordance with a retransmission request signal for requesting data retransmission, transmitted from radio receiving apparatus 700. Buffer 603 outputs the data to be retransmitted to switch 604 in accordance with this indication.

Control section 609 also counts the number of times of reception of the retransmission request signal, and performs switching control of switch 604 so that buffer 603 is connected to M-ary modulation section 605 at the time of an odd-numbered transmission including the first transmission, and buffer 603 is connected to bit-string conversion section 606 at the time of an even-numbered transmission.

In addition, control section 609 generates a transmission count notification signal indicating the number of times of transmission of the same data, and outputs this signal to modulation section 610. This transmission count notification signal is modulated by modulation section 610, multiplied by spreading code #A in multiplier 611, and then input to multiplexer 608.

Multiplexer 608 multiplexes the signal output from multiplier 607 and the signal output from multiplier 611, and outputs the resulting signal to radio transmitting section 612. Radio transmitting section 612 executes predetermined radio processing, such as up-conversion, on the multiplexed signal, and then transmits the multiplexed signal to radio receiving apparatus 700 via antenna 613.

Radio receiving section 614 executes predetermined radio processing, such as down-conversion, on the retransmission request signal received via antenna 613, and outputs the resulting signal to multiplier 615. Multiplier 615 multiplies the retransmission request signal output from radio receiving section 614 by spreading code #B. The retransmission request signal that has been subjected to despreading processing is demodulated by demodulation section 616, and input to control section 609.

In radio receiving apparatus 700, radio receiving section 702 executes predetermined radio processing, such as down-conversion, on the multiplexed signal received via antenna 701, and then outputs the multiplexed signal to multiplier 703 and multiplier 711.

Multiplier 703 multiplies the multiplexed signal by spreading code #1. By this means, a symbol spread by means of spreading code #1 is extracted from the multiplexed signal. The symbol that has been subjected to despreading processing is input to M-ary demodulation section 704.

M-ary demodulation section 704 executes demodulation processing corresponding to the M-ary modulation performed by radio transmitting apparatus 600 on the symbol that has been subjected to despreading processing, and outputs the demodulation result to switch 705. That is to say, M-ary demodulation section 704 here performs M-ary demodulation based on 16QAM. M-ary demodulation section 704 outputs a soft decision value for each data item contained in one symbol as the demodulation result.

Switch 705 is subject to switching control by control section 713, and connects M-ary demodulation section 704 to combining section 706 at the time of an odd-numbered transmission including the first transmission, and connects M-ary demodulation section 704 to bit-string back-conversion section 707 at the time of an even-numbered transmission.

Bit-string back-conversion section 707 performs the reverse of the bit-string rearrangement performed by bit-string conversion section 606 in bit-string conversion section 606. That is to say, bit-string reverse-conversion section 707 restores the bit-string order in one symbol to what it was before the bit-string was converted by bit-string conversion section 606. The rearranged demodulation result is output to combining section 706.

Combining section 706 combines the demodulation result input directly from M-ary demodulation section 704, or the demodulation result whose bit-string has been converted by bit-string reverse-conversion section 707, with a demodulation result stored in storage section 708. In other words, combining section 706 adds the soft decision values for each data item. In this way, high-quality demodulation results and low-quality demodulation results are alternately combined for each data item each time a retransmission occurs. Thus, the quality the demodulation results of each data in one symbol is improved to the same extent, and the quality of all data is made to meet a desired quality reliably. The combined demodulation result is input to error correction coding section 709 and also stored in storage section 708.

Error correction coding section 709 performs error correction coding of the combined demodulation result output from combining section 706, based on a Viterbi algorithm, for example. Data that has been subject to error correction coding is input to error detection section 710. Error detection section 710 performs error detection by means of a CRC or the like. Data for which an error is not detected by error detection section 710 becomes reception data. If an error is detected by error detection section 710, error detection section 710 generates the retransmission request signal and outputs this signal to modulation section 714.

This retransmission request signal is modulated by modulation section 714, multiplied by spreading code #B in multiplier 715, and then input to radio transmitting section 716. Radio transmitting section 716 executes predetermined radio processing, such as up-conversion, on the retransmission request signal after being subject to spreading processing, and then transmits the retransmission request signal to radio transmitting apparatus 600 via antenna 701.

Multiplier 711 multiplies the multiplex signal by spreading code #A. By this means, the transmission count notification signal spread by means of spreading code #A is extracted from the multiplex signal. The transmission count notification signal is demodulated by demodulation section 712, and then input to control section 713.

Control section 713 performs switching control of switch 705, in accordance with the number of times of transmission of the same data indicated by the transmission count notification signal, so that M-ary demodulation section 704 is connected to combining section 706 at the time of an odd-numbered transmission including the first transmission, and M-ary demodulation section 704 is connected to bit-string reverse-conversion section 707 at the time of an even-numbered transmission.

Figure 14:
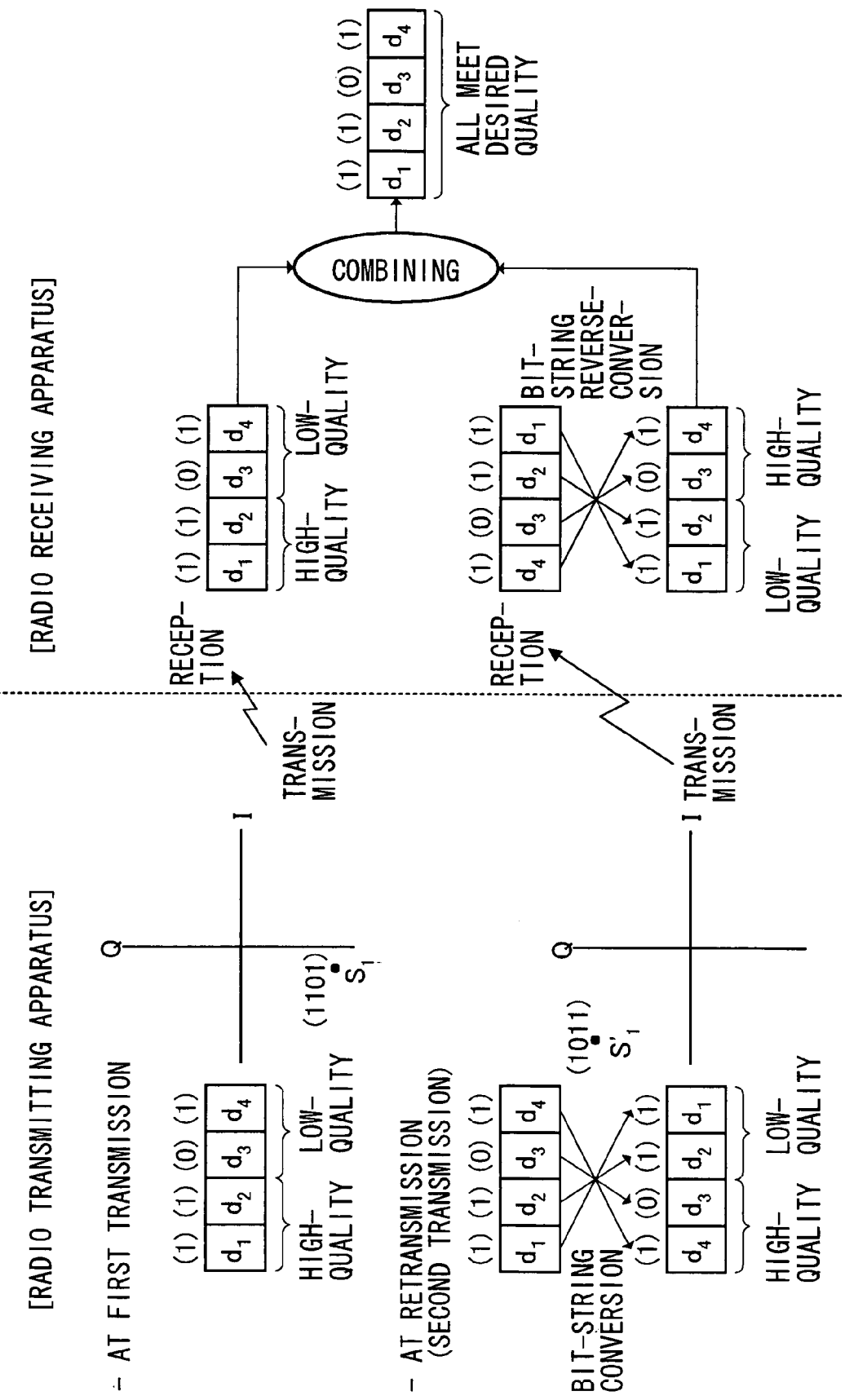
FIG. 14 is a drawing showing a typical operation of an M-ary modulation communication system according to Embodiment 2 of the present invention.

An operation of an M-ary modulation communication system having the above-mentioned configuration will now be described. FIG. 14 is a drawing showing a typical operation of an M-ary modulation communication system according to Embodiment 2 of the present invention. In FIG. 14, data denoted by $d_m$ indicates the m'th data, and the number shown in parentheses above $d_m$ indicates the content (0 or 1) of that data. $S_1$ and $S_1'$ indicate, respectively, the symbol transmitted in the first transmission and the symbol transmitted in the retransmission (second transmission).

First, in the first transmission, switch 604 in radio transmitting apparatus 600 connects buffer 603 to M-ary modulation section 605. Thus, transmission data is input to M-ary modulation section 605 without conversion of the bit-string. That is to say, in One symbol, $d_1$ is assigned to the first bit, $d_2$ to the second bit, $d_3$ to the third bit, and $d_4$ to the fourth bit. Therefore, in the first transmission, $d_1$ and $d_2$ are of higher quality than $d_3$ and $d_4$, and $d_3$ and $d_4$ are of lower quality than $d_1$ and $d_2$. The symbol containing $d_1$ through $d_4$ is subject to M-ary modulation by M-ary modulation section 605 using 16QAM. As this symbol $S_1$ is 1101, it is modulated so as to be placed at signal point $S_1$ indicated by the black dot in the IQ plane shown in the upper part of FIG. 14. In multiplexer 608, the modulated symbol is multiplexed with the transmission count notification signal indicating that this is the first transmission, and is then transmitted to radio receiving apparatus 700.

At the time of the first transmission, switch 705 in radio receiving apparatus 700 connects the M-ary demodulation section 704 to combining section 706. Thus, the demodulation result of each data item output from M-ary demodulation section 704 is input to combining section 706 without conversion of the bit-string. That is to say, in the first transmission, in radio receiving apparatus 700 the demodulation results of $d_1$ and $d_2$ are of higher quality than the demodulation results of $d_3$ and $d_4$, and the demodulation results of $d_3$ and $d_4$ are of lower quality than the demodulation results of $d_1$ and $d_2$. These demodulation results are stored in storage section 708.

At the time of the retransmission (second transmission), switch 604 in radio transmitting apparatus 600 connects buffer 603 to bit-string conversion section 606. Thus, transmit data stored on buffer 603 in the first transmission is subject to bit-string conversion by bit-string conversion section 606 before being input to M-ary modulation section 605. That is to say, the bit-string order in one symbol is reversed from that at the time of the first transmission. Thus, $d_4$ is assigned to the first bit, $d_3$ to the second bit, $d_2$ to the third bit, and $d_1$ to the fourth bit. Therefore, in the second transmission, $d_3$ and $d_4$ are of higher quality than $d_1$ and $d_2$, and $d_1$ and $d_2$ are of lower quality than $d_3$ and $d_4$. The symbol containing $d_1$ through $d_4$ is subject to M-ary modulation by M-ary modulation section 605 using 16QAM. As this symbol $S_1'$ with a converted bit-string is 1011, it is modulated so as to be placed at signal point $S_1'$, indicated by the black dot in the IQ plane shown in the lower part of FIG. 14. In multiplexer 608, the modulated symbol is multiplexed with the transmission count notification signal indicating that this is the second transmission, and is then transmitted to radio receiving apparatus 700.

At the time of the retransmission (second transmission), switch 705 in the radio receiving apparatus 700 connects M-ary demodulation section 704 to bit-string reverse-conversion section 707. Thus, the demodulation result of each data item output from M-ary demodulation section 704 is subject to bit-string rearrangement before being input to combining section 706. That is to say, bit-string rearrangement is performed that is the reverse of the bit-string rearrangement performed by bit-string conversion section 606 in radio transmitting apparatus 600, and the bit-string order in one symbol is restored to what it was before the bit-string was converted by radio transmitting apparatus 600. As a result of this rearrangement, $d_1$ is returned to the first bit, $d_2$ to the second bit, $d_3$ to the third bit, and $d_4$ to the fourth bit. At this time, the demodulation results of $d_1$ and $d_2$ are of higher quality than the demodulation results of $d_3$ and $d_4$, and the demodulation results of $d_3$ and $d_4$ are of lower quality than the demodulation results of $d_1$ and $d_2$. In combining section 706, these demodulation results are combined on a data item by data item basis with the demodulation results stored in storage section 708.

Figure 15:
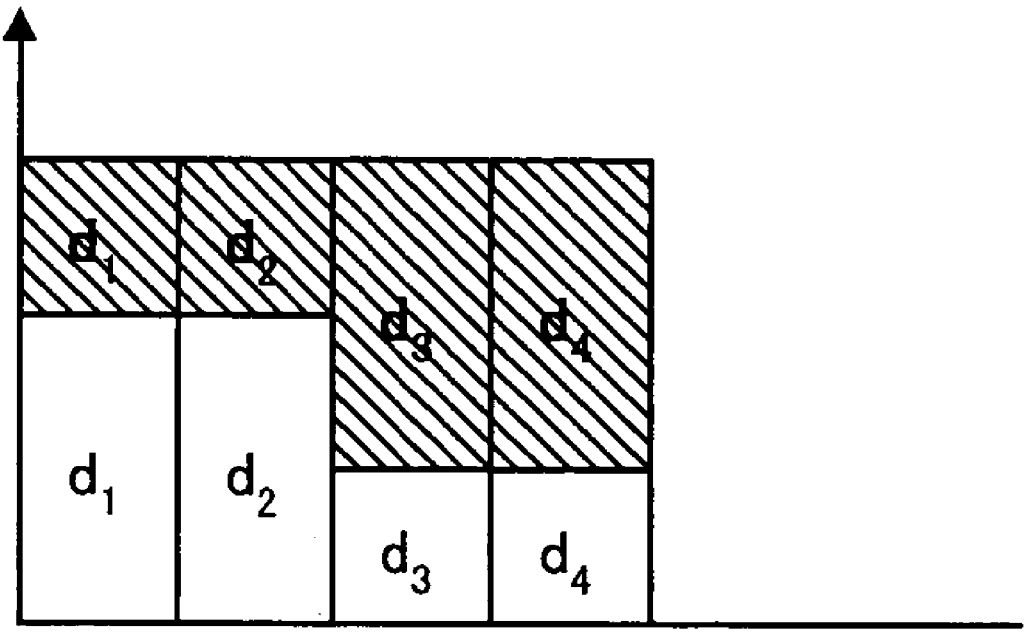
FIG. 15 is a drawing showing a typical data quality in an M-ary modulation communication system according to Embodiment 2 of the present invention.
Figure 15:
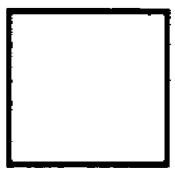
Figure 15:
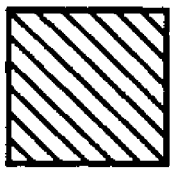

As a result of combining first-transmission demodulation results with retransmission (second-transmission) demodulation results in this way, the quality of the demodulation result of each data in one symbol is improved to the same extent as shown in FIG. 15. Therefore, the quality of all data is made to meet a desired quality reliably by means of a retransmission.

Thus, according to this embodiment, in a radio transmitting apparatus, when retransmitting, symbols are transmitted in which bit positions to which data are assigned in one symbol are changed from those in the first transmission, and in a radio receiving apparatus, the demodulation result of a symbol transmitted in the first transmission and the demodulation result of a symbol transmitted in a retransmission are combined. Also, according to this embodiment, data which was assigned to an upper bit in an odd-numbered transmission is assigned to a lower bit in an even-numbered transmission, and data which was assigned to a lower bit in an odd-numbered transmission is assigned to an upper bit in an even-numbered transmission. Thus, all data in one symbol has the same degree of resistance to error, and the quality of all data is made to meet a desired quality reliably. By this means, the number of times of retransmission can be reduced and throughput can be improved.

In this embodiment, in a radio receiving apparatus a configuration is adopted whereby error correction coding is performed using demodulation results after combining, but a configuration may also be adopted whereby demodulation results after combining are subjected to a hard decision directly without error correction coding being performed. In this case, it becomes not necessary for transmission data to be subject to error correction coding in the radio transmitting apparatus.

Also, in this embodiment, a configuration is adopted whereby all demodulation results in one symbol are combined in a combining section of a radio receiving apparatus, but a configuration may also be adopted whereby only demodulation results for data assigned to arbitrary bits are combined. For example, a configuration may be adopted whereby only high-quality demodulation results are combined.

Moreover, in this embodiment, a case is described in which 16QAM is used as an M-ary modulation method, and therefore two levels of quality can be set in a symbol: high or low. Therefore, a configuration is adopted whereby retransmission data is assigned to a high-quality bit and a low-quality bit alternately in a symbol each time a retransmission occurs. However, if 64QAM is used as an M-ary modulation method, three levels of quality can be set in a symbol: high, medium, or low. Therefore, when 64QAM is used, a configuration may be adopted whereby retransmission data is assigned successively to a high-quality bit, a medium-quality bit, and a low-quality bit in a symbol each time a retransmission occurs. The same applies to other M-ary modulation methods, such as 256QAM.

Furthermore, in this embodiment, a configuration is adopted whereby a radio receiving apparatus is notified of the number of times of transmission by the radio transmitting apparatus, but it is also possible for the radio receiving apparatus to count the number of times of transmission rather than being notified of the number of times of transmission.

Also, in this embodiment, there are no particular restrictions on the retransmission method. Therefore, the SAW (Stop-And-Wait) method, GBN (Go-Back-N) method, SR (Selective-Repeat) method, hybrid ARQ method, or the like, can be used as the retransmission method.

Moreover, in above Embodiments 1 and 2, it is desirable to change the M-ary modulation method in the radio transmitting apparatus with time according to the propagation path environment. That is to say, it is desirable for above Embodiments 1 and 2 to be used in combination with adaptive modulation.

Furthermore, the present invention is not limited to above Embodiments 1 and 2, and can be modified and implemented. For example, in above Embodiments 1 and 2, a case was described, as an example, in which the number of M-ary values is 16 (that is, one symbol is composed of four bits), but the above-mentioned Embodiments 1 and 2 may be similarly implemented as long as an M-ary modulation method is used in which one symbol contains a plurality of bits and the error rate is different for each bit.

Also, an M-ary modulation communication system of the present invention can be applied to a digital radio communication system such as a mobile communication system. That is to say, the radio transmitting apparatus can be applied to a base station, and the radio receiving apparatus can be applied to a communication terminal such as a mobile station.

As described above, according to the present invention, it is possible to improve throughput in data communications that use M-ary modulation.

This application is based on Japanese Patent Application No. 2000-398772 filed on Dec. 27, 2000, entire contents of which are expressly incorporated by reference herein.

The invention claimed is:

1. A data reception method for receiving data, the method comprising:
    (a) receiving data in a first transmission and a retransmission;
    (b) demodulating the received data of the first transmission and the retransmission;
    (c) swapping bit positions of the demodulated data within a symbol of the retransmission; and
    (d) combining (i) the demodulated data received in the first transmission and (ii) data with swapped bit positions resulting from step (c).

2. A data reception method for receiving data, the method comprising:
    (a) receiving data in a first transmission and a retransmission;
    (b) demodulating the received data of the first transmission and the retransmission;
    (c) swapping bit positions of the upper 2 bits and lower 2 bits of the demodulated data within a 16QAM symbol of the retransmission; and
    (d) combining (i) the demodulated data received in the first transmission and (ii) data with swapped bit positions resulting from step (c).

3. A data reception apparatus comprising:
    a reception section that receives data in a first transmission and a retransmission;
    a demodulation section that demodulates the received data of the first transmission and the retransmission;
    a swapping section that swaps bit positions of the demodulated data within a symbol of the retransmission; and
    a combining section that combines (i) the demodulated data received in the first transmission and (ii) data with swapped bit positions produced by said swapping section.

4. A data reception apparatus comprising:
    a reception section that receives data in a first transmission and a retransmission;
    a demodulation section that demodulates the received data of the first transmission and the retransmission;
    a swapping section that swaps bit positions of the upper 2 bits and lower 2 bits of the demodulated data within a 16QAM symbol of the retransmission; and
    a combining section that combines (i) the demodulated data received in the first transmission and (ii) data with swapped bit positions produced by said swapping section.

* * * * *